US012579134B2

(12) United States Patent
Wong

(10) Patent No.: US 12,579,134 B2
(45) Date of Patent: Mar. 17, 2026

(54) DATABASE QUERY GENERATION AND AUTOMATED SEQUENCING OF QUERY RESULTS

(71) Applicant: Evernorth Strategic Development, Inc., St. Louis, MO (US)

(72) Inventor: Mark D. Wong, Chesterfield, MO (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 43 days.

(21) Appl. No.: 18/101,935

(22) Filed: Jan. 26, 2023

(65) Prior Publication Data

US 2023/0237054 A1 Jul. 27, 2023

Related U.S. Application Data

(60) Provisional application No. 63/303,458, filed on Jan. 26, 2022.

(51) Int. Cl.
| | |
|---|---|
| *G06F 16/242* | (2019.01) |
| *G06F 9/451* | (2018.01) |
| *G06F 16/248* | (2019.01) |
| *G06N 3/04* | (2023.01) |
| *G06N 3/063* | (2023.01) |

(52) U.S. Cl.
CPC .......... *G06F 16/2425* (2019.01); *G06F 9/451* (2018.02); *G06F 16/248* (2019.01); *G06N 3/04* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 7,831,632 B2 | 11/2010 | Djugash | |
| 8,112,708 B2 | 2/2012 | Griffin | |
| 9,367,853 B2 | 6/2016 | Cronin | |
| 9,606,985 B2 | 3/2017 | Goussard | |
| 9,753,962 B2 | 9/2017 | Petschulat | |
| 10,515,155 B2 | 12/2019 | Bachrach | |
| 10,546,002 B2 | 1/2020 | Cheung | |
| 10,860,557 B2 | 12/2020 | Eberl | |
| 2009/0099870 A1* | 4/2009 | Wilkinson | G06F 40/274 |
| | | | 705/3 |
| 2014/0164981 A1 | 6/2014 | Colley | |
| 2016/0012135 A1* | 1/2016 | Wang | G11C 5/06 |
| | | | 707/731 |

(Continued)

*Primary Examiner* — Dawaune A Conyers
(74) *Attorney, Agent, or Firm* — Miller Johnson

(57) ABSTRACT

A system includes memory hardware configured to store instructions and processor hardware configured to execute the instructions. The instructions include generating an interactive graphical user interface including a first user interface element. The instructions include, in response to a user entering a text string into the first user interface element: generating a second user interface element, generating predictive elements based on the text string, and populating the second user interface element with the predictive elements. The instructions include, in response to the user selecting one of the predictive elements: adding the predictive element to a fourth user interface element, querying a database based on the predictive element, and populating a fifth user interface element with results of the query.

18 Claims, 26 Drawing Sheets

(56)             References Cited

U.S. PATENT DOCUMENTS

| 2018/0197049 A1* | 7/2018 | Tran | G06N 3/084 |
| 2018/0203921 A1 | 7/2018 | Privault | |
| 2020/0019546 A1* | 1/2020 | Luo | G06F 16/245 |
| 2020/0349441 A1* | 11/2020 | Zhang | G06N 3/047 |
| 2021/0133255 A1* | 5/2021 | Puzicha | G06F 16/332 |
| 2022/0277031 A1* | 9/2022 | Quamar | G06F 16/90332 |

* cited by examiner

Pallet Sizing And Pucking Device(s) — 206

Loading Device(s) — 208

Inspect Device(s) — 210

Unit of Use Device(s) — 212

Automated Dispensing Device(s) — 214

Manual Fulfillment Device(s) — 216

Review Devices — 218

Imaging Device(s) — 220

Cap Device(s) — 222

Accumulation Devices — 224

Packing Device(s) — 226

Literature Device(s) — 228

Unit of Use Packing Device(s) — 230

Mail Manifest Device(s) — 232

112

800-2

PULMONARY ADHERENCE

CLINICAL INSIGHTS > SUBPOPULATION : NON-ADHERENT >
AGE 31-65 > PDC RANGE : 0-60

VIEW POPULATION >

61-74
9

75-85
6

0-60
35

PULMONARY ADHERENCE

☑ AGE    31-65

☐ BIOLOGICAL SEX

☐ RISK SCORE

☐ ENGAGEMENT SCORE

☐ LAST CLINICAL OUTREACH

☑ PDC RANGE    0-60

☐ LAST CLAIM DAYS SUPPLY

☐ REMOTE MONITORING 800-3

0-60  35 LIVES

CLINICAL INSIGHTS > SUBPOPULATION : NON-ADHERENT > AGE 31-65 > PDC RANGE : 0-60

< BUBBLE VIEW                                    MANAGE COLUMNS  |  EXPORT TO CSV

| PATIENT NAME ◁▷ | MEMBER ID ◁▷ | DOB ◁▷ | OPEN OPPORTUNITIES ◁▷ | RISK SCORE◁▷ | PDC ◁▷ | PRM ◁▷ |
|---|---|---|---|---|---|---|
| LANCE ABREU | 1707543469955 | 11/01/1978 | 2 | HIGH | 21 | NOT OFFERED |
| KENZIE CHAPPUIS | 1867494990320 | 06/01/1975 | 1 | HIGH | 24 | NOT OFFERED |
| PRESTION PERRING | 4926798852337 | 02/01/1968 | 1 | HIGH | 48 | UTILIZING |
| SEAN KOSTICK | 0025827280663 | 11/01/1963 | 0 | HIGH | 41 | NOT OFFERED |
| SHENIQUA VAILES | 7021402332642 | 05/01/1975 | 0 | HIGH | 50 | NOT OFFERED |
| JAVON BE | 1626336555081 | 04/01/1957 | 4 | LOW | 38 | NOT OFFERED |
| ALISHA KARTMAN | 8618884475726 | 06/01/1959 | 4 | LOW | 50 | UTILIZING |
| CAMERON HAMONS | 4229240032112 | 07/01/1971 | 3 | LOW | 18 | UTILIZING |

JAVON BE

CLINICAL INSIGHTS > SUBPOPULATION : NON-ADHERENT > AGE 31-65 > PDC RANGE : 0-60 > JAVON BE

| MEMBER NUMBER | DATE OF BIRTH | ENGAGEMENT SCORE |
| --- | --- | --- |
| 16263655081 | 04/01/1957 | |
| CLIENT NAME | AGE | NO DATA |
| | 63 | CHANNEL SCORE SHOW |
| PHONE NUMBER | BIOLOGICAL SEX | |
| (852) 375-0361 | FEMALE | |

| OVERALL RISK SCORE |
| --- |
| LOW |

OUTCOMES   OUTREACH   OPPORTUNITIES   REFERRALS   MEDICATIONS   CONDITIONS   ALLERGIES   LAB DATA   REMOTE MONITORING

OUTREACH

LOG OUTREACH

| CHANNEL ⇕ | RECIPIENT ⇕ | DATA SENT ⇕ | SENT BY ORGANIZATION ⇕ | OUTCOME ⇕ | TYPE ⇕ |
| --- | --- | --- | --- | --- | --- |
| WEB | PATIENT | 11/19/2019 | EXPRESS SCRIPTS | OPTED IN | DIABETES REMOTE MONITORING REGISTRATION |

FIG. 8D

DATABASE QUERY GENERATION AND AUTOMATED SEQUENCING OF QUERY RESULTS

CROSS-REFERENCE TO RELATED APPLICATIONS

This application claims the benefit of U.S. Provisional Application No. 63/303,458 filed 26 Jan. 2022, the entire disclosure of which is incorporated by reference.

FIELD

The present disclosure relates to database query creation and more particularly to iterative formation of a database query and processing of query results.

BACKGROUND

Non-relational databases store data as individual unconnected files. By contrast, relational databases organize data in predefined relationships with the data stored in one or more relations (or tables) of columns and rows. Relational databases offer significant benefits by maintaining relationships or structural and logical connections between different tables. However, relational databases often require users to learn and master complex domain-specific programming languages in order for users to effectively access and navigate their data. Furthermore, users typically need to have an understanding of the relationships and logical connections within the different tables of the database—the deeper the user's understanding, the more readily the user will be able to find the relevant data. As a result, mastery of such databases comes with a steep learning curve, making them inaccessible to lay users. What is needed are interactive graphical user interfaces and database access tools to make even complex databases easily accessible by even lay users. The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes memory hardware configured to store instructions and processor hardware configured to execute the instructions. The instructions include generating an interactive graphical user interface including a first user interface element. The instructions include, in response to a user entering a text string into the first user interface element: generating a second user interface element, generating predictive elements based on the text string, and populating the second user interface element with the predictive elements. The instructions include, in response to the user selecting one of the predictive elements: adding the predictive element to a fourth user interface element, querying a database based on the predictive element, and populating a fifth user interface element with results of the query.

In other features, the text string is converted to an input vector and passed to a trained machine learning model to generate the predictive elements. In other features, the trained machine learning model includes a trained neural network. In other features, the trained neural network includes an input layer having a plurality of nodes, one or more hidden layers having a plurality of nodes, and an output layer having a plurality of nodes. In other features, each node of the input layer is connected to at least one node of the one or more hidden layers, each node of the input layer represents a numerical value, and the at least one node of the one or more hidden layers receives the numerical value multiplied by a weight as an input.

In other features, the at least one node of the one or more hidden layers receives the numerical value multiplied by the weight and offset by a bias as the input. In other features, the at least one node of the one or more hidden layers is configured to sum inputs received from nodes of the input layer, provide the summed inputs to an activation function, and provide an output of the activation function to one or more nodes of a next layer. In other features, the predictive elements include at least one of a first data structure associated with one or more medications, a second data structure associated with one or more laboratory tests, and a third data structure associated with one or more medical conditions. In other features, the fifth user interface element displays the results of the query in an interactive table.

A computer-implemented method includes generating an interactive graphical user interface including a first user interface element. The method includes, in response to a user entering a text string into the first user interface element: generating a second user interface element, generating predictive elements based on the text string, and populating the second user interface element with the predictive elements. The method includes, in response to the user selecting one of the predictive elements: adding the predictive element to a fourth user interface element, querying a database based on the predictive element, and populating a fifth user interface element with results of the query.

In other features, the text string is converted to an input vector and passed to a trained machine learning model to generate the predictive elements. In other features, the trained machine learning model includes a trained neural network. In other features, the trained neural network includes an input layer having a plurality of nodes, one or more hidden layers having a plurality of nodes, and an output layer having a plurality of nodes. In other features, each node of the input layer is connected to at least one node of the one or more hidden layers, each node of the input layer represents a numerical value, and the at least one node of the one or more hidden layers receives the numerical value multiplied by a weight as an input.

In other features, the at least one node of the one or more hidden layers receives the numerical value multiplied by the weight and offset by a bias as the input. In other features, the at least one node of the one or more hidden layers is configured to sum inputs received from nodes of the input layer, provide the summed inputs to an activation function, and provide an output of the activation function to one or more nodes of a next layer. In other features, the predictive elements include at least one of a first data structure associated with one or more medications, a second data structure associated with one or more laboratory tests, and a third data structure associated with one or more medical conditions.

A computerized method includes presenting a plurality of data elements to a user in a graphical user interface, presenting a plurality of value choices to the user in the graphical user interface in response to a selection by the user of a first data element of the plurality of data elements, performing a first query on a database in response to a selection by the user of a first value choice of the plurality of value choices, determining a subset of the plurality of data elements based on results of the first query, presenting the subset of the plurality of data elements to the user in the graphical user interface, presenting a graphical representation of a subset of records from the database in response to a selection by the user of values for multiple data elements of the plurality of data elements, and queuing a set of channel-specific communications for the subset of records in response to a request by the user. The first query is based on the first value choice. The subset is determined by the selected values for the multiple data elements.

A system includes memory hardware configured to store instructions and processing hardware configured to execute the instructions stored by the memory hardware. The instructions include presenting a plurality of data elements to a user in a graphical user interface, presenting a plurality of value choices to the user in the graphical user interface in response to a selection by the user of a first data element of the plurality of data elements, performing a first query on a database in response to a selection by the user of a first value choice of the plurality of value choices, determining a subset of the plurality of data elements based on results of the first query, presenting the subset of the plurality of data elements to the user in the graphical user interface, presenting a graphical representation of a subset of records from the database in response to a selection by the user of values for multiple data elements of the plurality of data elements, and queuing a set of channel-specific communications for the subset of records in response to a request by the user. The first query is based on the first value choice. The subset is determined by the selected values for the multiple data elements.

A non-transitory computer-readable medium storing processor-executable instructions. The executable instructions include presenting a plurality of data elements to a user in a graphical user interface, presenting a plurality of value choices to the user in the graphical user interface in response to a selection by the user of a first data element of the plurality of data elements, performing a first query on a database in response to a selection by the user of a first value choice of the plurality of value choices, determining a subset of the plurality of data elements based on results of the first query, presenting the subset of the plurality of data elements to the user in the graphical user interface, presenting a graphical representation of a subset of records from the database in response to a selection by the user of values for multiple data elements of the plurality of data elements, and queuing a set of channel-specific communications for the subset of records in response to a request by the user. The first query is based on the first value choice. The subset is determined by the selected values for the multiple data elements.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 8A-8D are mockups of an example implementation of a user interface for use with the present disclosure.

In the drawings, reference numbers may be reused to identify similar and/or identical elements.

DETAILED DESCRIPTION

Introduction

Figure 1:
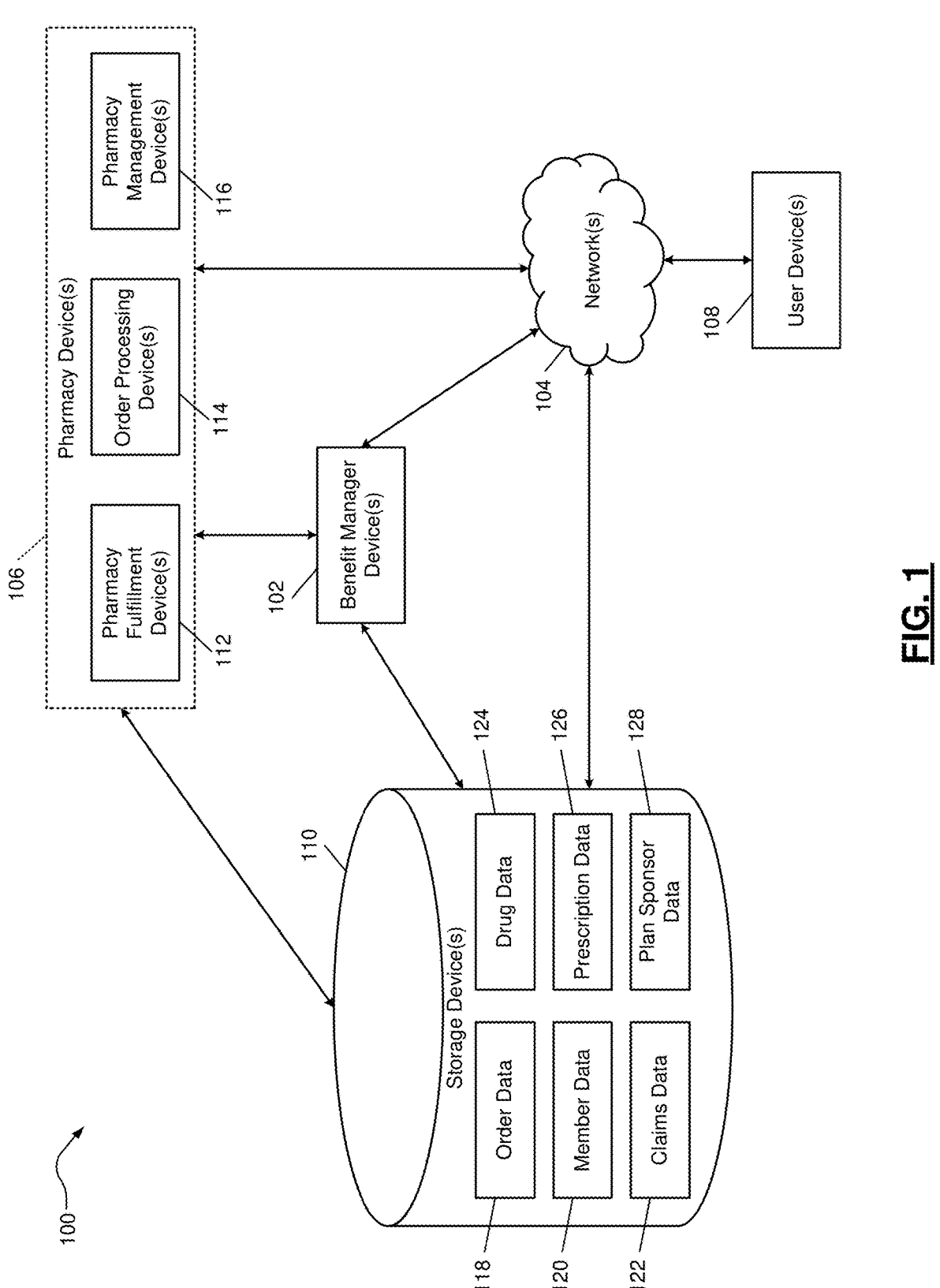
FIG. 1 is a functional block diagram of an example system including a high-volume pharmacy.

When a subject matter expert in the healthcare field—such as a pharmacist, doctor, or other clinician—analyzes data, the expert will frequently want to narrow the universe of data down to a specific population. Traditionally, generating a population from a universe of data objects is performed by a data scientist or a database administrator. For example, the data scientist may need to translate the requirements of the subject matter expert into structured query language (SQL) commands. The data scientist may then execute those statements and materialize a view into a graphical user interface or other business intelligence platform.

If the subject matter expert determines that the generated population is under- or over-inclusive, or simply wants to investigate those possibilities, further rounds of iterative development with the data scientist may be necessary. In addition to the inefficiency of involving both people, as well as the delay created by multiple iterations, the inefficiency may cause the subject matter expert to perform less experimentation than would be optimal to ensure the correct population is identified. In addition, because the skillsets, experiences, and lexicons of the subject matter expert and data scientist may differ, there may be something lost in translation between what the subject matter expert desires and what the data scientist executes.

To mitigate or eliminate these problems, an automated query generation capability is disclosed. A graphical user interface presents a variety of data elements to the subject matter expert for selection. As a small set of examples, the data elements may include demographic information such as gender and age, pharmacy data such as days' supply on hand of a prescription, medical information such as disease diagnoses, and laboratory information such as hemoglobin level or weight.

As the subject matter expert selects data elements of interest, values for those data elements are presented for selection by the subject matter expert. For example, once a medical diagnosis data element is selected, a set of possible diagnoses is displayed. The set may be based on the most prevalent diagnoses in the data set. Once the subject matter expert selects a diagnosis, such as type 2 diabetes, the subject matter expert may be able to select further data elements to narrow the population. Each narrowing step may present options informed by prior steps. For example, once a diabetes diagnosis is selected, a selection of prescription data values for a prescription data element may present prescriptions specific to a patient population where each patient in the population has been diagnosed with diabetes. The subject matter expert may be presented with a set of prescriptions that are most prevalent in this subpopulation.

The graphical user interface may allow the subject matter expert to include and/or exclude various groups of patients based on a variety of data elements. The data elements may be determined and then presented to the subject matter expert based on what data fields are present in a source data store. Artificial intelligence may be used to identify data fields that are relevant to a subject matter expert. In addition, the artificial intelligence may assist in selecting values for the data element. This may be performed in batches, such as once per night, or on the fly.

For example, once a subset of male diabetics is selected, an artificial intelligence may determine what ages are included in that subpopulation and cluster the ages into statistically significant bins, each spanning one or more years. The subject matter expert can then select bins of interest. As one specific example, predefining age ranges as ten-year segments may not be helpful when there is only one patient in their 80s and one patient in their 90s. In such a case, the artificial intelligence may propose, just as an example, an age range of 72 to 100. In various limitations, the artificial intelligence may use a clustering algorithm, such as K-means clustering, to determine how many clusters to identify as well as which ranges each cluster should encompass.

When the subject matter expert is selecting values for data elements, a graphical indication of relative sizes of the corresponding subpopulations may be presented. For example, this graphical indication may be a simple numeral or may be indicated by the size of the shape. As another example, a pie chart may indicate the proportion of a subpopulation that falls into each of a set of age categories. The subject matter expert may use this graphical indication to determine how wide an age range to select for analysis.

The graphical user interface may allow the subject matter expert to combine a number of data elements using a bullion and logic. Within each data element, OR Boolean logic be used while, in various other implementations, AND Boolean logic may be available. For example, a subject matter expert may be able to select multiple prescribed drugs such that a patient in the resulting population must have been prescribed at least one of those drugs—or that a patient must have been prescribed all of the selected drugs. The graphical user interface may allow the subject matter expert to specify a timeframe such that only patients having relevant data within the timeframe of interest are included in the population.

Figure 4A:
FIGS. 4A-4I are example mockups of user interface elements for a graphical user interface according to the principles of the present disclosure.

A graphical illustration of an implementation of the graphical user interface is shown in FIG. 4A. A subject matter expert or other user can specify a name for a new population of interest and can then specify a timeframe. The timeframe may be capable of being specified by beginning and end with a granularity of one day and may have defined options for selection—such as year-to-date, prior calendar year, and the one year prior to the current date.

Figure 4B:
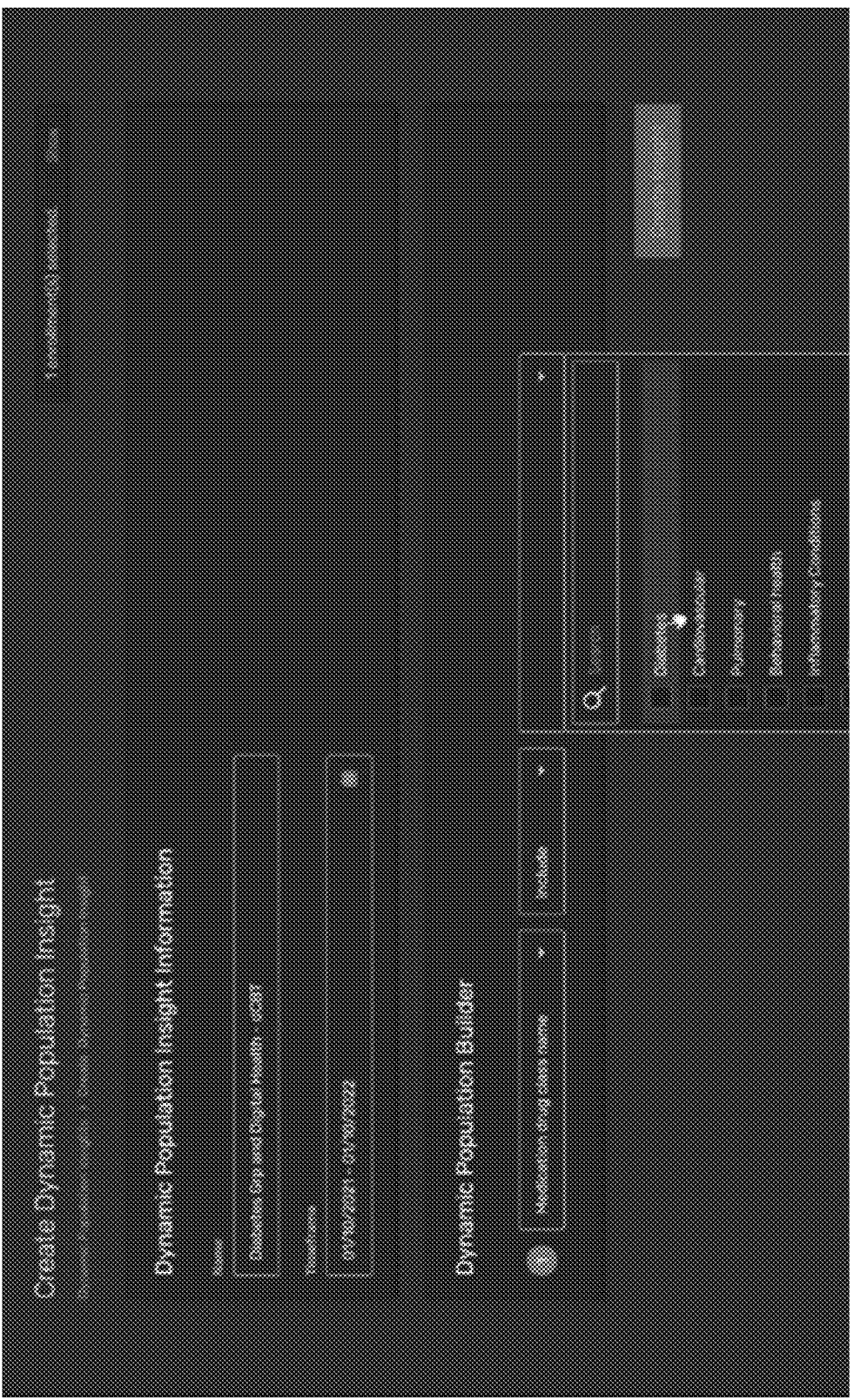

In the depicted example, a dynamic population builder section of the user interface allows the user to select from a set of data elements. One example of a data element is medical condition. Another, as shown in FIG. 4B, is medication drug class name. The user can choose to include or exclude patients from the population based on the medication drug class name. In this specific example, a list of medication drug class names is presented, which may be derived from the underlying data. For example, these may be the most commonly occurring medication drug class names in the population. Though not shown here, an indication of this size of the population for each of these medication drug class names may be shown in numeric or graphical form.

Figure 4C:
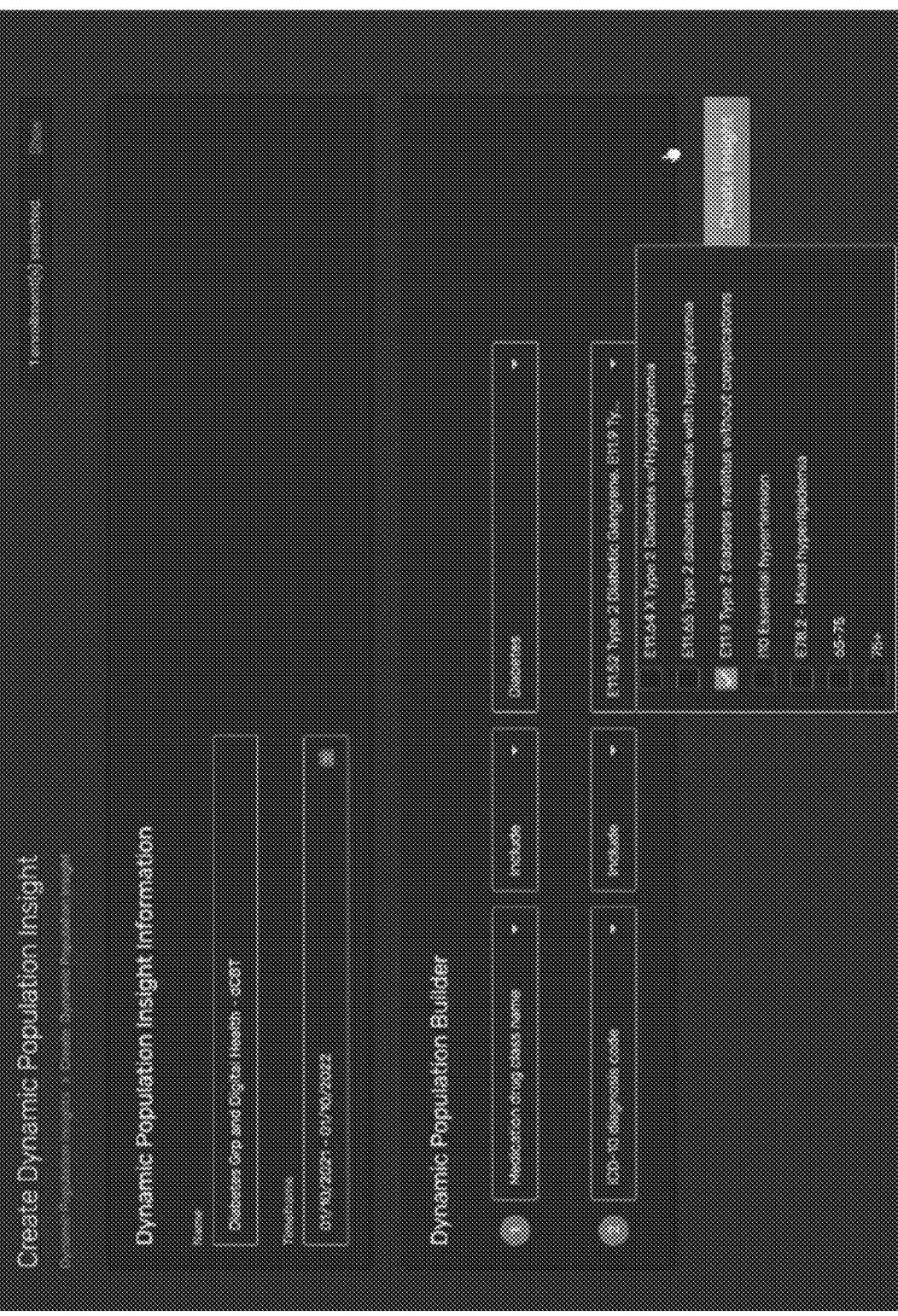

In FIG. 4C, the user has made selections to include those patients who have prescriptions in the diabetes medication drug class. The user has next selected another data element, ICD-10 (International Classification of Diseases) diagnosis code. The user is then presented with a range of potential diagnosis codes. In various implementations, the presented diagnosis codes are tailored to the prior data element selection—in this case, the diabetes medication drug class. In other words, the value options displayed for the ICD-10 diagnosis code are those options available for the subpopulation of patients who have been prescribed diabetes medication. The list of options may not only be limited based on the current subpopulation but may also be ordered according to their prevalence in this subpopulation.

As indicated by check boxes, the user may be permitted to select multiple ICD-10 diagnosis codes. These may be combined with a Boolean (also known as logical) OR to create a population where each patient has at least one of the ICD-10 diagnosis codes. Though not shown, the user interface may have the capability of using other Boolean logic to combine diagnosis codes. For example, the user may specify that a patient should only be included in the population if they have 2 or more of the selected diagnosis codes. In other implementations, the user may be allowed to instruct that patients in the population must satisfy all of the selected diagnosis codes.

Figure 4D:
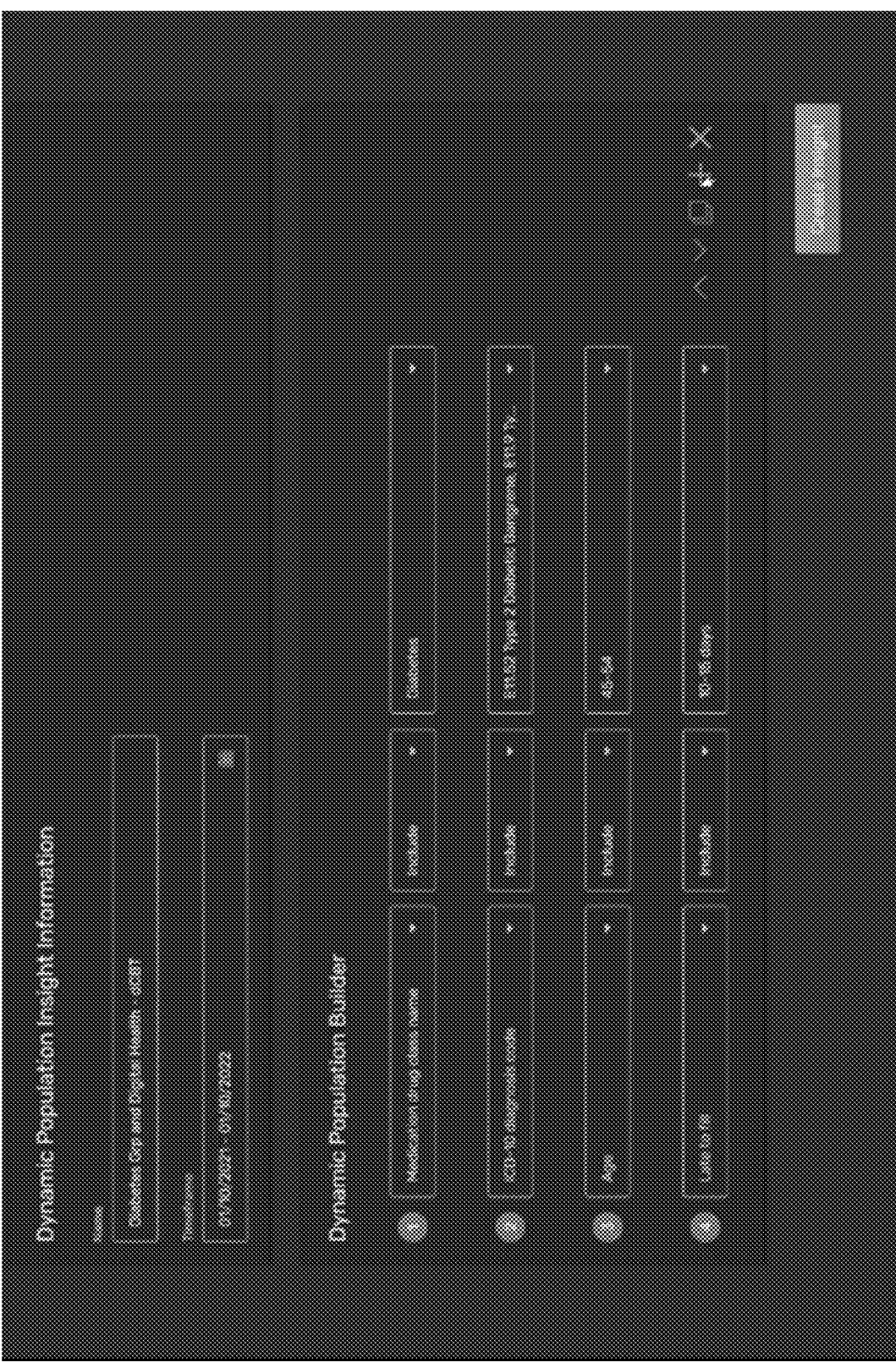

In FIG. 4D, the user has selected diagnoses codes including E11.52 and E11.9. The user has further selected an age data element. The user may be permitted to manually specify age ranges and/or may be presented with age range options. As described above, these age range options may be specific to the subpopulation of patients defined by elements 1 and 2 (diabetes medication drug class and specific ICD-10 diagnostic codes diagnosis codes). In addition, the age ranges may be dynamically determined so that, for example, an age range with few or zero patients is not proposed.

In FIG. 4D, the user has further selected a late-to-fill data element, which indicates whether the user has failed to fill a prescription within a specified period of an expected date. For example, the expected date may be determined based on when a previous fill of the prescription is expected to run out. If a patient has not yet filled a refill at this time, they likely have either run out of the prescription or were not taking the prescription according to the prescribed regimen. In FIG. 4D, the user has specified a window for the late-to-fill metric of 10 to 15 days. The user can then select the "create insight" user interface element to analyze data based on the population defined by the four displayed data elements.

The user can select any of their created populations, such as the population created using the data elements in FIG. 4D.

Figure 4E:
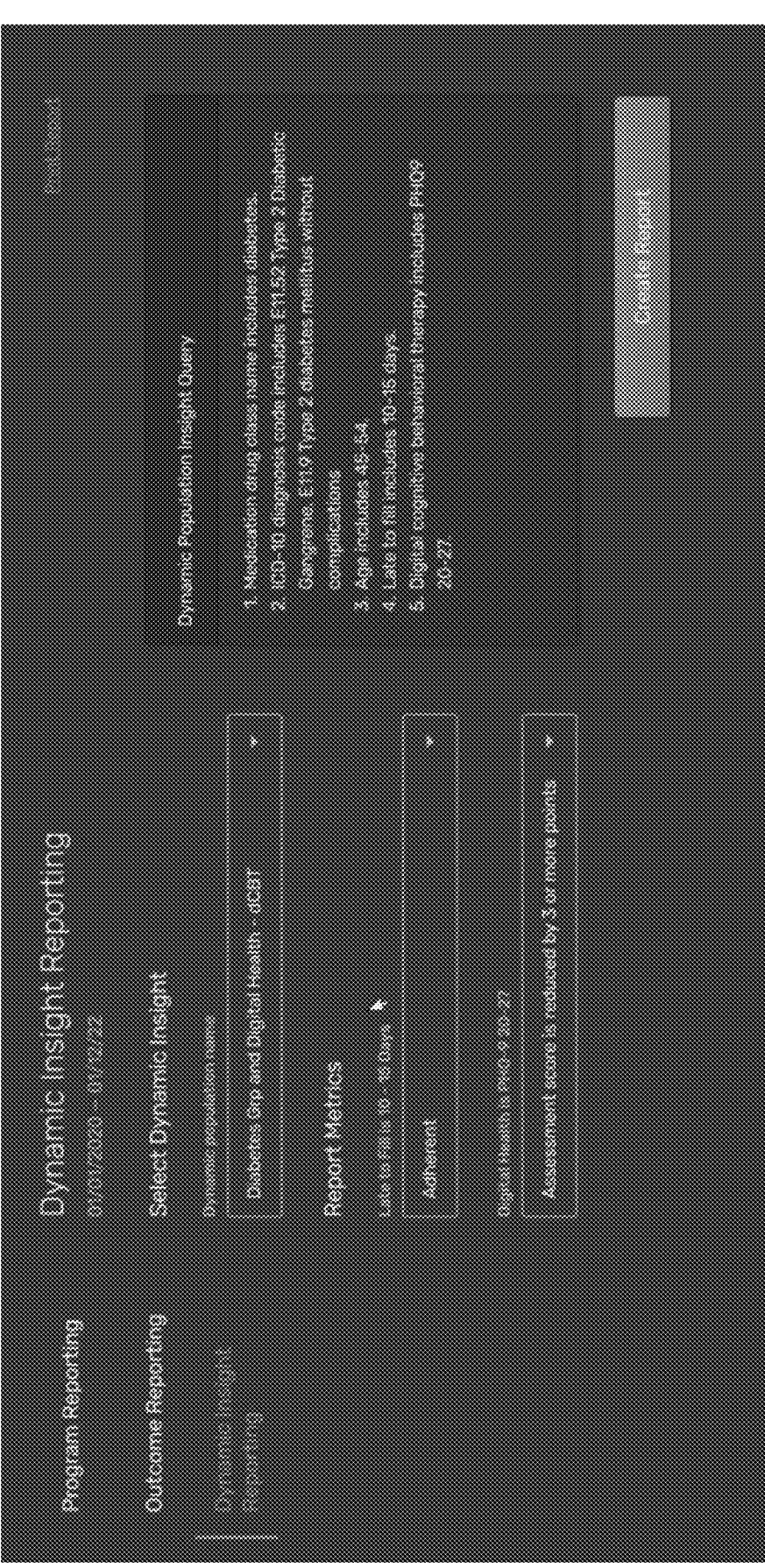

As shown in FIG. 4E, a metric can be generated based on the selected population, and various report metrics may be defined. As an example only, the report metrics shown in FIG. 4E relate to medication adherence and to a reduction in score of a patient health questionnaire 9 (PHQ-9) assessment. The report may include tabular data as well as visualizations, such as bar charts, pie charts, column charts, scatter graphs, 3D line charts, etc.

Figure 4F:
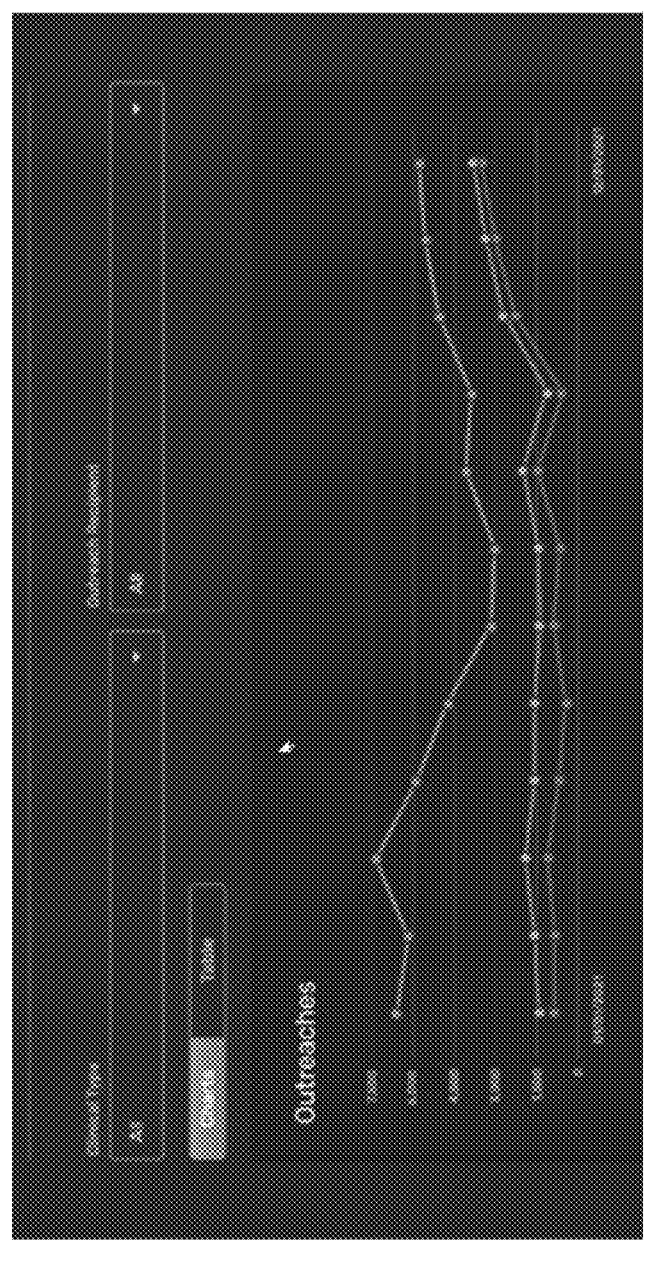

In FIG. 4F, an example of a chart of outreaches (also referred to as interventions) for a calendar year is shown. The chart is based on a chosen population and includes three data series. The data series are, in this particular example, from bottom to top, successful outreaches, outreaches attributed to savings, and total outreaches. An outreach may be determined as successful if an adherence measure is improved following the outreach. A savings may result from a user improving their adherence, though the connection to the outreach may not be demonstrable. In this chart, a machine learning algorithm may have determined how to bend the data to present monthly totals. For example, weekly values could be shown (the vertical scale of the chart would then be approximately reduced by 3/4), but the variance in the data may be too high, making the chart less helpful to the viewer.

Figure 4G:

FIG. 4G demonstrates an example interface for displaying patients within a population. This graphical representation as a grid may include column headings that allow for sorting based on different fields and may allow for filtering within this population. The number, type, position, and size of the columns may be controlled by a user. The user can export the data for use in other tools, such as using a comma separated value (CSV) format. The user can also build interventions as shown below in FIG. 4I.

Figure 4H:
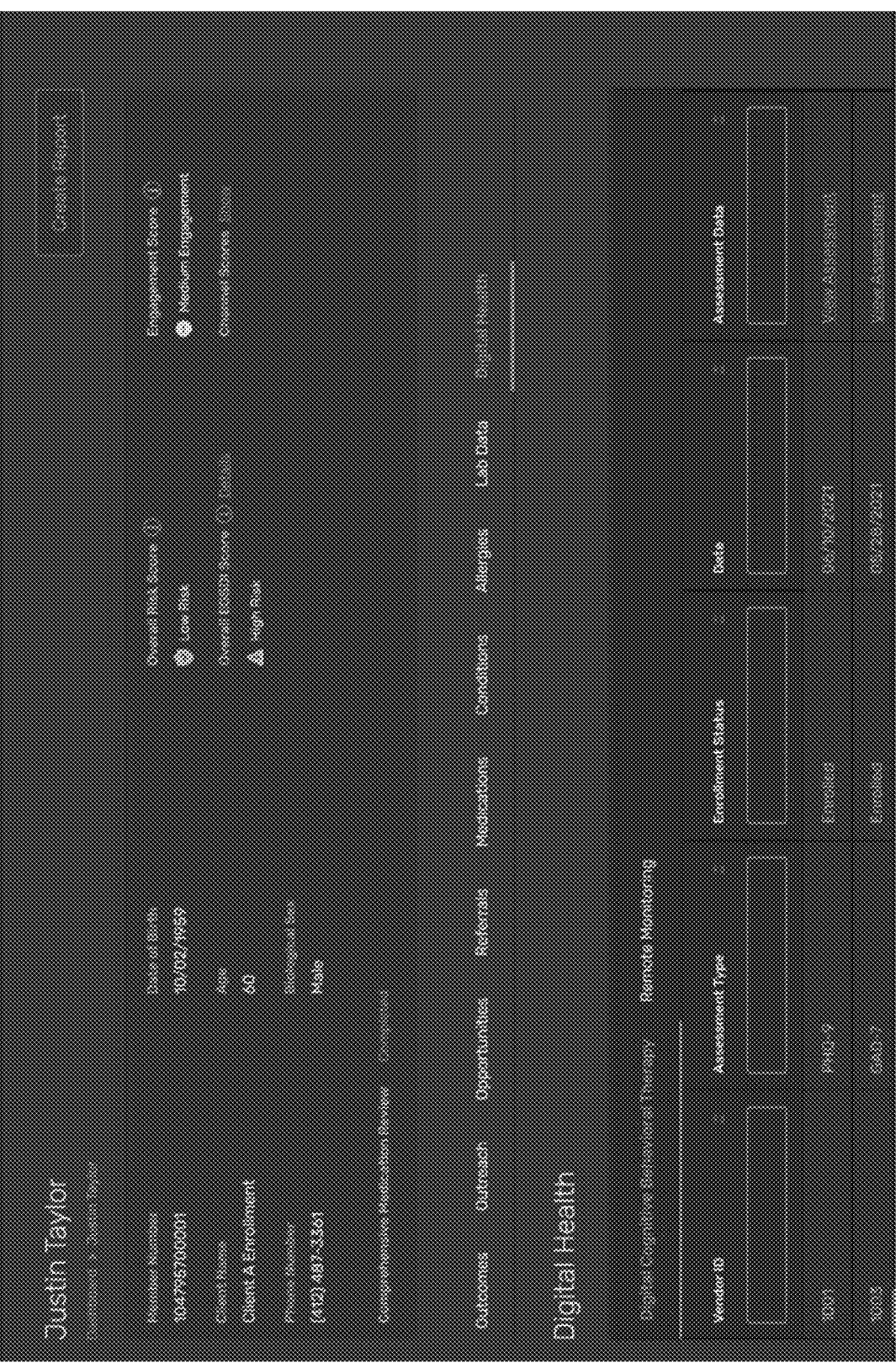

In FIG. 4H, detailed information about one of the patients from FIG. 4G is displayed. This view may result from the user selecting, such as by clicking or double-clicking on, the patient's name in FIG. 4G.

Figure 4I:
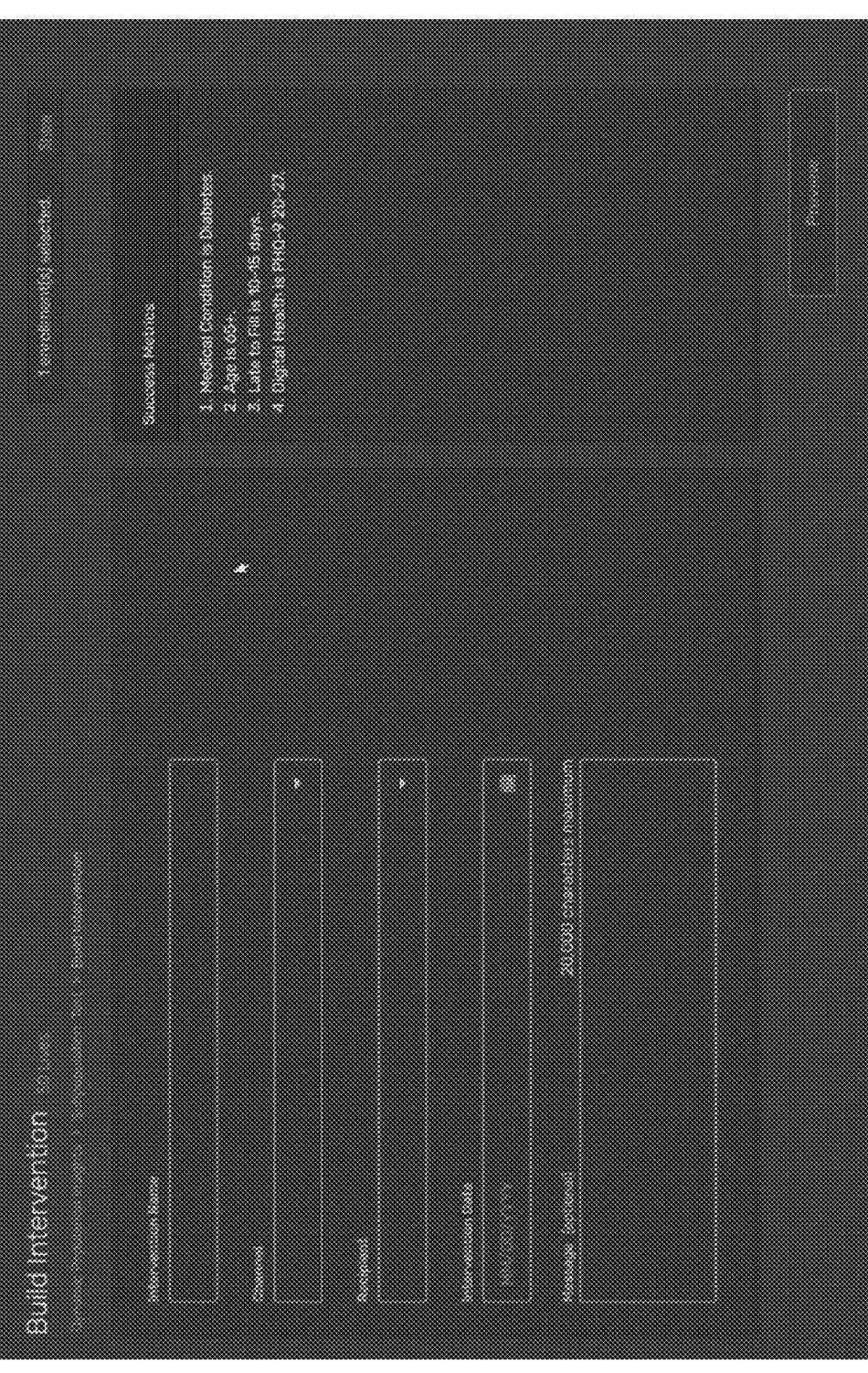

In FIG. 4I, an example intervention building interface is shown. An intervention may be built for a population or some subset of a population or even for an individual patient. The intervention may be as simple as a form email being sent to the patient, such as with instructions of how to refill a prescription or a reminder that a prescription is overdue for refilling. As described in more detail below, the intervention may be scheduled for a future time or date and may take a number of forms across a variety of different communication channels.

In addition, the intervention may be staged or sequenced such that a first intervention (such as a text message) is followed by a second intervention (such as a call from a pharmacist). Further, certain of the interventions may be tailored based on patient information. For example, patients with diagnoses related to eyesight may have larger fonts. As another example, selection between a text message and an email may be made based on patient age.

The sequence of interventions may be conditioned on continued non-adherence. For example, if after a first intervention the patient refills their prescription, the remaining interventions may be canceled or delayed. In various implementations, the intervention may be dependent on a dynamic view of the population, such that if the user falls out of the population while the intervention chain is being performed, the user will not receive subsequent interventions in the chain. Similarly, a user who comes into the population partly through an intervention sequence may be started at the beginning of the intervention sequence or may join the other members of the population with whatever interventions are being executed.

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
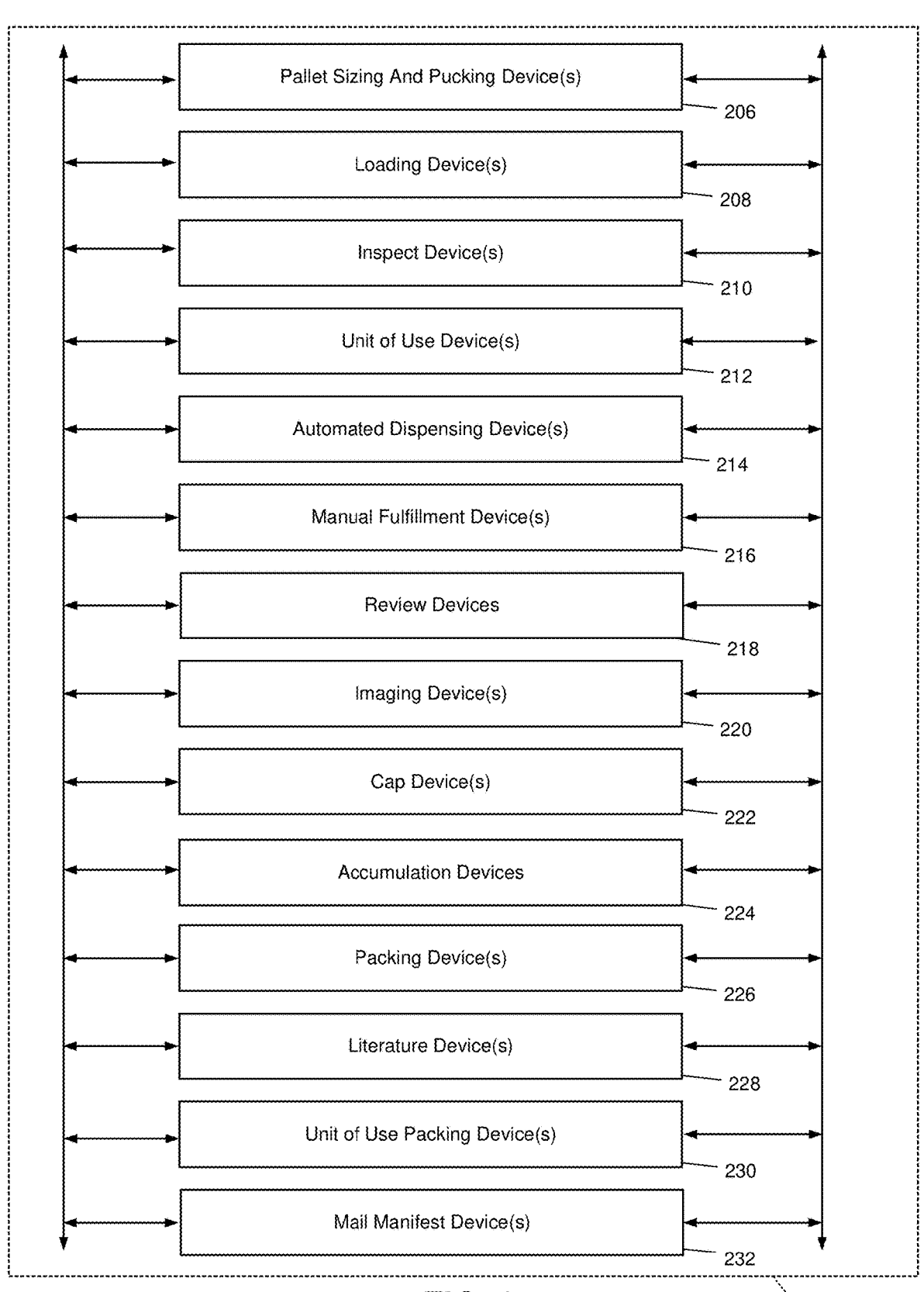
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
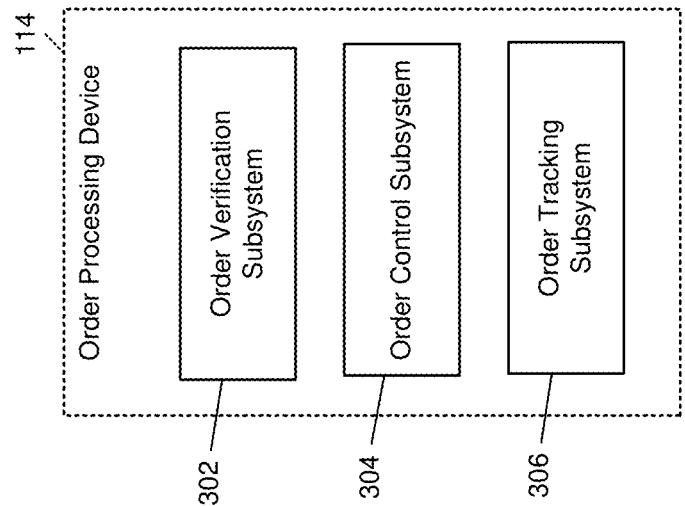
FIG. 3 is a functional block diagram of an example order processing device, which may be deployed within the system of FIG. 1.
Figure 3:

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Automated Clinical Database Element Monitoring System

In various implementations, an automated clinical database element monitoring system allows a client to access user interface to analyze the client's patient population. The client may be a healthcare provider, health insurance plan provider, monitoring device vendor, or organization that offer employer-sponsored plans to their employees. The patients may be, for example, members enrolled in a health insurance plan offered by or sponsored by a client. As part of their analysis, the client may look for clinical gaps and opportunities and take action to perform patient outreaches or interventions.

The care insights hub user interface may include multiple graphical user interfaces (GUIs), sometimes referred to as dashboards, for monitoring different aspects of the patient populations. For example, a performance guarantees dashboard may allow a client to monitor performance of members of the client's patient population, to compare prescription drug adherence or other metrics of the members to performance guarantees (such as target adherence levels or target health monitoring improvement value), in order to identify areas of concern. The user may select a clinical performance guarantee target, and view automatically generated health insights for sub-populations that are either meeting or not meeting the performance guarantee target.

In various implementations, a user may view clinical insights of patients independent of performance guarantee targets. For example, a user may select a clinical insights dashboard to uncover issues in specific patient sub-populations. The user may successively narrow down the sub-population by a number of demographic and clinical variables. The variables may be applied in any order, and the user can traverse forward and backward in their analysis, by adding or removing variables. Sub-populations may be presented on a screen of a user interface as multiple shapes, with a size of each shape representing the size of the patient sub-population that meets the selected criteria. As just one example, the shape may be a bubble, and the diameter of the bubble may be proportional (such as linearly or exponentially) to the size of the sub-population.

Once a user has narrowed down to a specific sub-population, the user may switch to a sub-population list to view the members in that sub-population. In various implementations, the user may select from up to thirty or more demographic and clinical fields to be displayed for each patient in the list. The user may further refine the sub-population list by applying a filter based on any of the displayed fields.

In various implementations, the user may "drill down" to a patient in the sub-population list, reaching an individual patient view that displays details of the patient, such as intervention opportunities, outreaches, referrals, medications, medical conditions, lab data, remote monitoring, referrals and other data. From the individual patient view, a user may perform a manual outreach, or refer a patient to another clinician. The user may traverse back to the sub-population list from the individual patient view, and back to the clinical insights bubble view from the sub-population list view.

Figure 5:
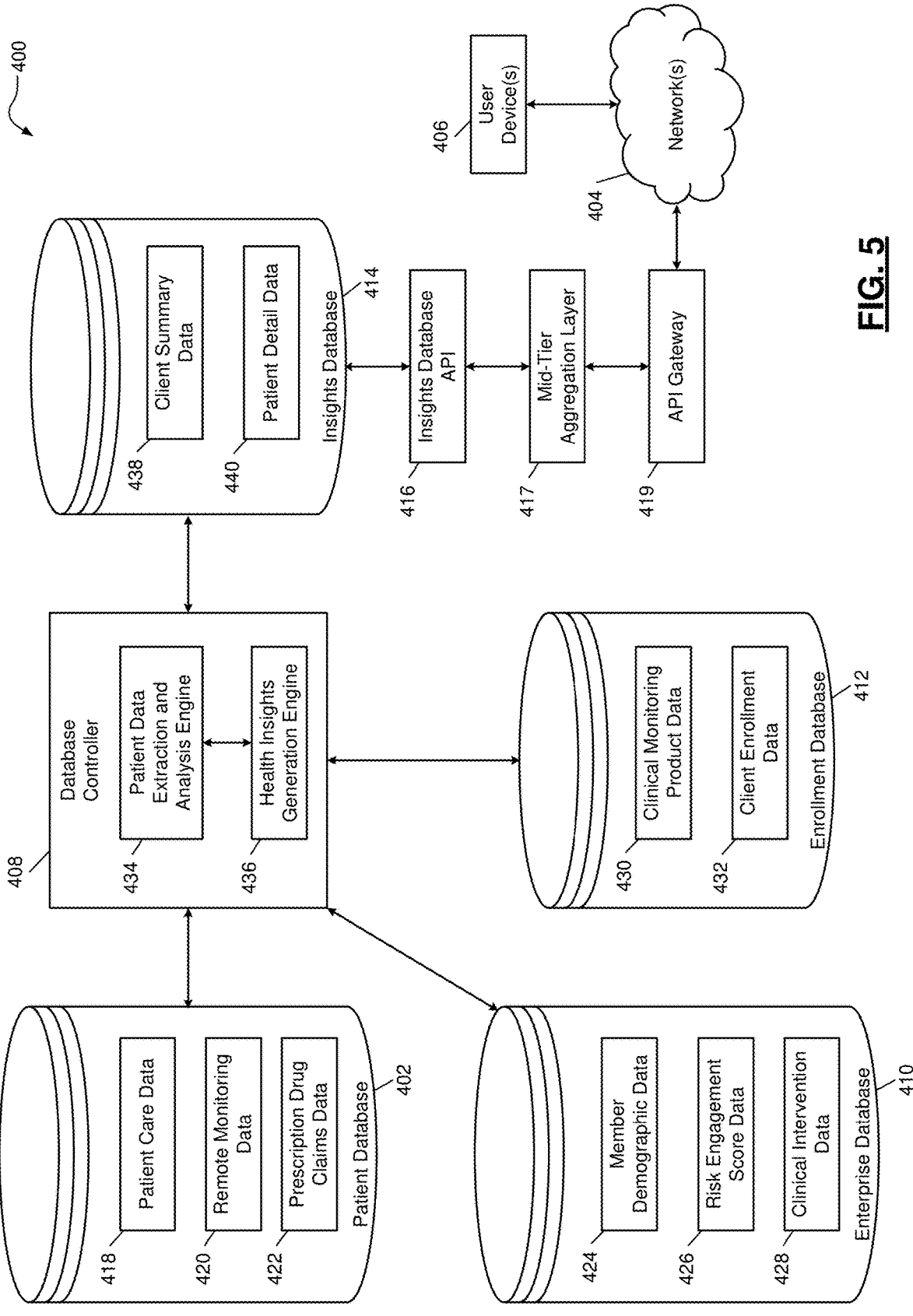
FIG. 5 is a functional block diagram of an example system for automated monitoring of clinical database elements.

FIG. 5 is a functional block diagram of an example automated monitoring system 400 for automated monitoring of clinical database elements. The system 400 includes multiple databases, which may be deployed in a computer network system. The system 400 may include one or more servers, desktop computers, laptop computers, tablets, smartphones, etc.

As shown in FIG. 5, the system 400 includes a patient database 402 that stores patient care data 418, remote monitoring data 420, and prescription drug claims data 422. The patient care data 418, remote monitoring data 420, and prescription drug claims data 422 may be located in different physical computer-readable media. In some implementations, the patient care data 418, remote monitoring data 420, and prescription drug claims data 422 may be located in the same computer-readable medium (such as in different address ranges of a common memory array).

In various implementations, the patient database 402 may include a Teradata database that obtains data from multiple sources. For example, the prescription drug claims data 422 may be obtained from a data store that includes information about proportion of days covered (PDC) claims associated with different patients. Remote monitoring data 420 may include data obtained from sensor devices that detect health parameters associated with the patient—an example of a sensor device is a glucose meter, which may be used by a patient with diabetes. The patient care data 418 may include medical history records for various patients. Although FIG. 5 illustrates three types of data stored in the patient database 402, various implementations may include other suitable types of data associated with patient health information.

The system 400 includes an enterprise database 410 that stores member demographic data 424, risk engagement score data 426, and clinical intervention data 428. The member demographic data 424, risk engagement score data 426, and clinical intervention data 428 may be located in different physical memories within the enterprise database 410, or may be located in the same memory.

The enterprise database 410 may include a Teradata database that stores the enterprise data. For example, the member demographic data 424 may store any suitable demographic information (such as age and sex) for members of a group health plan. The risk engagement score data 426 may include data that is indicative of potential health risks for various members, such as a likelihood that the member will experience a negative health event within a specified future time period.

The clinical intervention data 428 may include data indicative of various intervention options to reduce the likelihood of the negative future health event for the member. For example, the clinical intervention data 428 may include data about various communication channels such as text, email, physical mail, etc., for contacting the user to address the potential health risk. Other example clinical intervention options may include automated phone calls, or live calls from a pharmacist or physician. The clinical intervention data 428 may include data about the success of the various types of interventions for one or more members according to historical interventions. Although FIG. 5 illustrates three types of data stored in the enterprise database 410, various implementations may include other suitable types of data (which may be associated with a health plan provider).

The system 400 also includes an enrollment database 412 that stores clinical monitoring data 430 and client enrollment data 432. The clinical monitoring data 430 and client enrollment data 432 may be located in different physical memories within the enrollment database 412, or may be located in the same memory. In various implementations, the system 400 may use a distributed streaming platform such as Apache Kafka to obtain enrollment and product offering data, which may be synchronized in a Hadoop database.

As shown in FIG. 5, the system 400 includes a database controller 408 that interfaces with the patient database 402, the enterprise database 410, and the enrollment database 412. The database controller 408 includes a patient data extraction and analysis engine 434. The patient data extraction and analysis engine 434 may obtain one or more of the patient care data 418, the remote monitoring data 420, and the prescription drug claims data 422 from the patient database 402, and process the obtained data according to one or more rules.

For example, the patient data extraction and analysis engine 434 may compile data about adherence of patients to prescription drug dosage plans, omission of care situations, care optimization status, etc. The compiled data may be stored in a Teradata staging database, which may be accessed by the health insights generation engine 436.

The health insights generation engine 436 may process data received from the patient database 402, the enterprise database 410, and the enrollment database 412. For example, the health insights generation engine 436 may receive data indicative of eligibility of patients for participation in one or more product offerings of the system 400, and process eligible patients according to the member demographic data 424 received from the enterprise database 410.

The health insights generation engine 436 may then determine one or more scores for each patient, such as a risk score, an engagement score, and a channel score, according to the risk engagement score data 426 received from the enterprise database 410. The health insights generation engine 436 may determine whether any historical intervention updates have occurred for each patient, according to the clinical intervention data 428 received from the enterprise database 410.

In various implementations, the health insights generation engine 436 may perform code mapping by mapping product identifiers with the clinical monitoring data 430 and the client enrollment data 432 obtained from the enrollment database 412. For example, the code mapping may be performed on the previously processed member demographics, risk score, engagement score, and score, channel score, and clinical intervention updates according to one or more rules specified for the health insights generation engine 436.

The health insights generation engine 436 interfaces with the insights database 414, which stores client summary data 438 and patient detail data 440. For example, the health insights generation engine 436 may supply processed data to staging tables in the insights database 414. A client summary staging table may create stored data that has been calculated or summarized by the health insights generation engine 436 at a group label level, while a patient detail staging table stores calculated or summarized data from the health insights generation engine 436 at an individual patient level.

In various implementations, each staging table supplies data to a Talend ETL insight platform, based on a periodic extraction process. As an example, a nightly refresh from the Talend ETL insight platform may update tables in the insights database 414. In various implementations, the client summary data 438 may be stored in a Postgres table that provides a patient summary by client entity, while the patient detail data 440 is stored in a Postgres table that provides details by individual patient.

The client summary data 438 may include multiple parameters, such as an umbrella product description (for example, diabetes adherence), a status of whether specified criteria are met or not met, an age range subgroup, a gender subgroup, a status of whether remote monitoring is offered for a group, etc. The client summary data 438 may be summarized by a number of adherent patients within a client group, compared to a number of non-adherent patients in the client group. The patient detail data 440 may allow a user to drill down into various parameters related to individual patients, as described further below.

As shown in FIG. 5, the insights database 414 interfaces with an insights database application programming interface (API) 416. For example, the insights database API 416 may provide access to the insights database 414, to allow data from the insights database 414 to be displayed on a user interface screen (such as a screen of the user device 406). In various implementations, the insights database API 416 may be used to validate whether a user is allowed to access data from the insights database 414, prior to sending information for display on a user interface screen.

FIG. 5 also illustrates the system 400 including a mid-tier aggregation layer 417 that interfaces with the insights database API 416. In various implementations, the mid-tier aggregation layer 417 may pull data from sources other than the insights database 414, such as user profiles, authentication credentials, references to external databases other than the insights database 414, etc. The mid-tier aggregation layer 417 may be configured to perform one or more functions on data transmitted to the user device 406, such as routing functions, calculation functions and formatting functions (for example, transforming data from disparate sources into a standardized format for a user interface of the user device 406).

The API gateway 419 may be a passthrough gateway, such as a firewall. The API gateway 419 may allow the user device 406 to view insights from the insights database 414 via one or more networks 404. For example, an administrator may operate a user interface of the user device 406 to analyze clinical database elements. The user device 406 may include any suitable user device for displaying text and receiving input form a user, including a desktop computer, a laptop computer, a tablet, a smartphone, etc. The user device 406 may access the insights database 414 through one or more networks 404, the API gateway 419, the mid-tier aggregation layer 417, and the insights database API 416.

Block Diagrams

Figure 6:
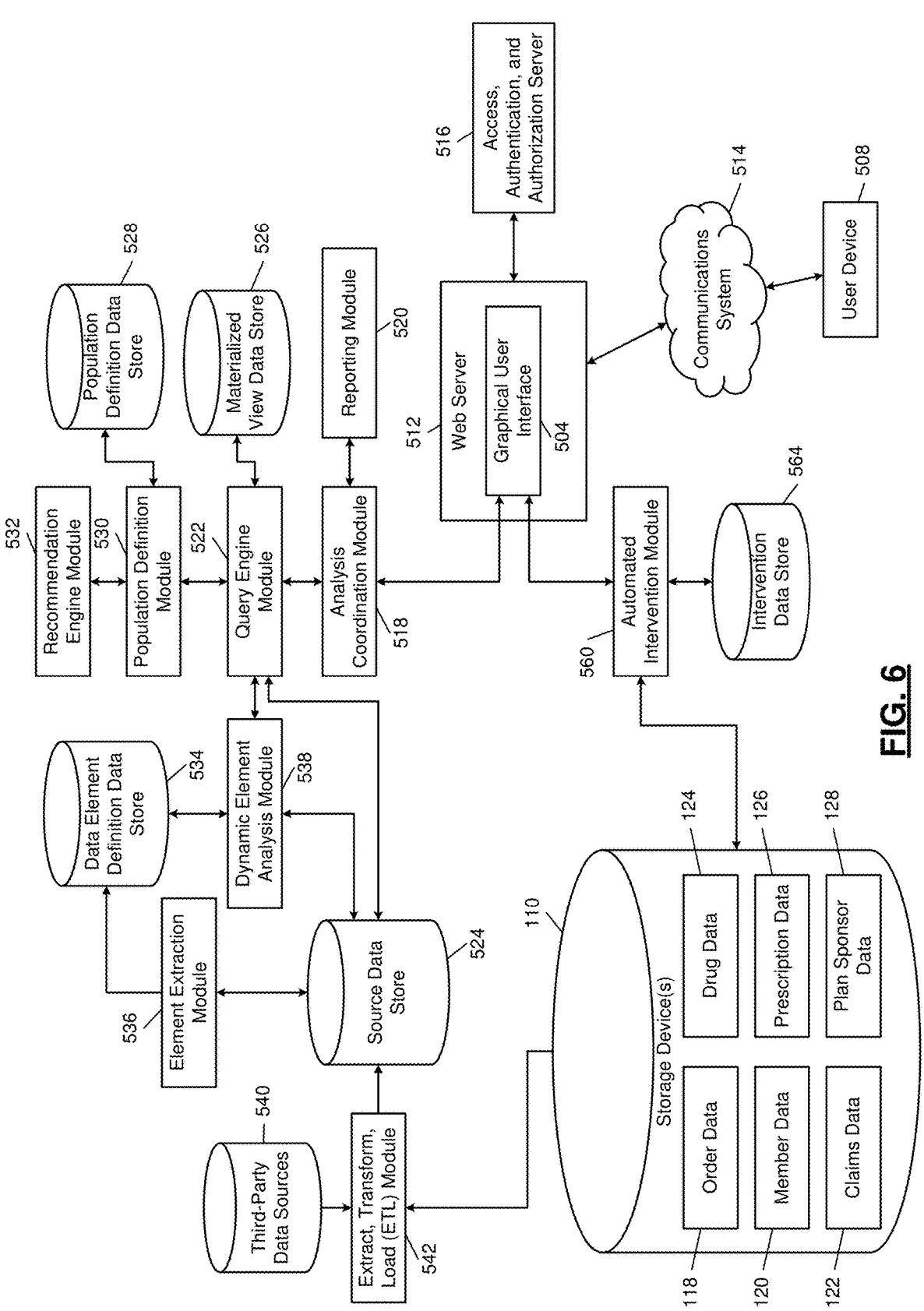
FIG. 6 is a functional block diagram of an example implementation of a query generation system according to the principles of the present disclosure.
Figure 7:
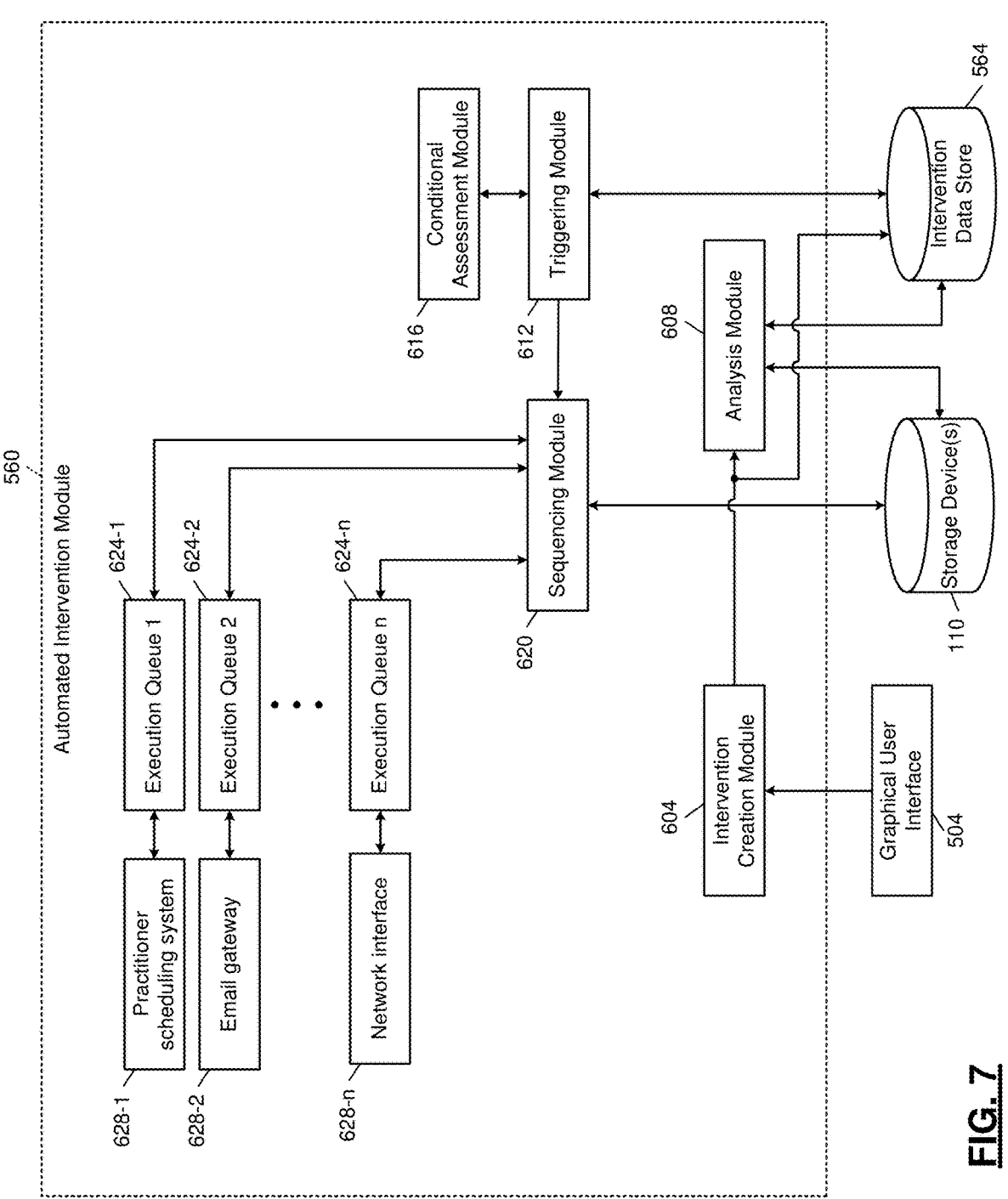
FIG. 7 is a functional block diagram of an example implementation of an automated intervention system according to the principles of the present disclosure.

In FIG. 6, the subject matter expert interacts with a graphical user interface 504 of a system according to the present disclosure using a user device 508. For example, the user device 508 may be a laptop, smartphone, tablet, desktop computer, etc. The graphical user interface 504 may be hosted by a web server 512. The user device 508 communicates with the web server 512 via a communications system 514. The communications system 514 may include wired and wireless local area networks, enterprise networks, and the internet.

As described above, the user is able to form a population using the graphical user interface 504 without needing to have expertise in database schemas, computer programming, or SQL commands. The ability of the user to access any of the data may be governed by an access, authentication, and authorization server 516.

The graphical user interface 504 provides a graphical frontend for ease of use to the user and, on the back end, communicates with an analysis coordination module 518. The analysis coordination module 518 relies on a reporting module 520 and a query engine module 522. The analysis coordination module 518 uses the query engine module 522 to build a data query and to obtain data.

The reporting module 520 compiles and formats the data and provides the resulting conclusions to the graphical user interface 504, which renders them in a graphical format, such as a chart, table, or graph. The reporting module 520 may itself include or rely on a database, data warehouse, or other data store. The reporting module 520 may combine, sum, etc. various data, such as adding together costs for a given population of patients over a period of time. The reporting module 520 may also perform analysis, such as identifying which patients have evidenced improved adherence scores over a certain period of time. The metrics used by the reporting module 520 may be informed by or selected by settings provided by the user via the graphical user interface 504.

The query engine module 522 generates a population according to parameters specified by the user. The resulting population may be represented as a SQL command. For efficiency, data from the resulting population may be cached. Data for the universe of patients is stored in a source data store 524. Although shown as a single unit, the source data store 524 may be functionally, logically, or physically separated into multiple data stores.

A population may be defined by the query engine module 522 and then cached in a materialized view data store 526. In other implementations, a materialized view of the data may be provided by a database engine that operates the source data store 524.

The definition of the population designated by the user is stored in a population definition data store 528 by a population definition module 530. For example, each user may be permitted to store multiple population definitions in the population definition data store 528. Users may be able to share population definitions with other users. In some implementations, sharing may be restricted based on organizational rules, such as restricting population definitions from a user associated with one company from being shared with a user associated with a second company. In various implementations, population definitions may be shareable across multiple users based on defined defaults, such as roles. For example, all pharmacists may be able to see each other's population definitions, subject to sharing restrictions, because they share the role of pharmacist.

A recommendation engine module 532 may propose population definitions for users based on historical data from other users. For example, when a user starts to create a population, the recommendation engine module 532 may present similar populations that have already been defined. Further, based on similarities between one user and other users, such as role within the organization, the recommendation engine module 532 may propose populations of interest for the user to consider.

When creating a population, the query engine module 522 relies on data elements, such as demographic, clinical, laboratory, and pharmacy fields. These data elements may be defined by records in a data element definition data store 534. The source data store 524 can be mined for fields that have can be used as data elements. This mining may be performed through a combination of manual review and machine learning by an element extraction module 536. For example, the element extraction module 536 may identify demographic fields such as age, weight, and gender within the source data store 524 and defined those as potential data elements in the data element definition data store 534.

The query engine module 522 presents data elements to a user from a dynamic element analysis module 538. As narrowing elements are selected by the user, the resulting population shrinks. For example, selecting certain diagnostic codes may end up eliminating non-female genders from the population. Once this occurs, the dynamic element analysis module 538 will recognize that filtering based on gender is no longer possible and may therefore exclude gender from the list of available data elements. This exclusion may be indicated, such as by a text label in the user interface, that explains that only female gender patients are present in the population.

The dynamic element analysis module 538 may dynamically propose values for data elements. For example, when age is selected, the dynamic element analysis module 538 may determine what ages are present in the existing population (as limited by prior data element value choices) and determine what ranges of ages could be proposed. For example, if there are no patients under the age of 35 once other population narrowing data elements have been selected, values for the user to choose for age will be modified by the dynamic element analysis module 538: for example, age ranges of 10 to 20 and 20 to 30 will be excluded; instead, the first age range may begin at 35.

The dynamic element analysis module 538 may perform a clustering analysis on the ages to determine recommended age ranges. The user may be able to override these with a manual age range selection. In various implementations, the clustering analysis used may be bounded such that the number of clusters is limited to being, as examples only, at least 4 clusters but no more than 12 clusters.

When multiple elements are used to define the population, the order of those elements may be changed. Changing the order of the elements may change which selections are available for values of the elements. For example, if age is the first data element to narrow the population from the universe of potential patients, a wide range of ages may be available. However, if a diagnostic code related to macular degeneration is selected as the first data element and age is now a subsequent data element, the ages of potential patients may be much higher than in the overall universe of patients.

When presenting options to the user, the dynamic element analysis module 538 may rank or order those options, such as based on prevalence in the narrowed population. For example, once an age range and diagnostic codes related to diabetes are selected, if a data element related to medications is selected, the most common medications may trend toward medications used in the treatment of diabetes. The dynamic element analysis module 538 may present the most common medications used by that population of diabetics in reverse order of occurrence frequency—that means, the prescriptions that are most common for that subpopulation will be listed at the top.

In various implementations, the dynamic element analysis module 538 may group certain prescriptions based on a grouping algorithm or based on grouping data structures, which may be populated by a combination of manual curation and machine learning. For example, different dosages of a particular drug may be grouped together as a single prescription. However, a single drug may have different effects at a low dosage or a high dosage and therefore these two zones of dosage should be kept separate as two separate prescriptions. This information may be retained in the data element definition data store 534.

The source data store 524 includes records from the storage device 110 and may also include data from third-party data sources 540. In various implementations, an extract, transform, load (ETL) module 542 may process the data before it is stored in the source data store 524. The ETL module 542 may perform operations including normalization, deduplication, etc.

In FIG. 6, an example implementation of an automated intervention module 560 is shown. The automated intervention module 560 can be controlled by the graphical user interface 504. For example, one or more interventions may be defined for a patient or some or all of a population of patients. Interventions that have been defined are stored in an intervention data store 564.

In various implementations, the automated intervention module 560 includes an intervention creation module 604 that is actuated by the graphical user interface 504. The intervention creation module 604 stores created interventions into the intervention data store 564 and may also provide input to an analysis module 608.

The analysis module 608 may be used to track the efficacy of interventions and may also be used to create historical and prospective studies of intervention efficacy. For example, the analysis module 608 may track a portion of a population that receives the intervention as well as the remaining portion of the population that does not receive an intervention and identify over time whether any statistically significant behavioral differences are observed across the population. This may be used, for example, to determine who to target with future interventions as well as which inventions are most effective for certain populations.

An intervention for a patient or a subset of a population may include a single intervention or a sequence of interventions. Whether a single intervention or a sequence, the interventions may be timed to be most effective. For example, sending emails in the middle of night may be less likely to be seen by the intended audience. Further, experimental data may indicate that email interventions are more effective when not sent on Mondays. The intervention data store 564 may store timing information about when interventions should be sent.

In various implementations, the automated intervention module 560 includes a triggering module 612 that, based on timing information stored by the intervention data store 564, determines when interventions are ready to be executed. A conditional assessment module 616 may determine whether conditions are correct for executing an intervention. For example, interventions for a patient may be suspended or canceled when conditions of the patient change. In one situation, the patient may have re-filled a prescription, thereby returning to adherence to their prescription regimen. In another situation, the patient may be associated with a different health system and as a result all interventions may be canceled.

If the intervention meets the criteria as determined by the conditional assessment module 616, the triggering module

612 provides the intervention to a sequencing module 620. The sequencing module 620 determines what type of intervention will be performed. This might be specified by the intervention in the intervention data store 564 and may be influenced by conditions analyzed by the conditional assessment module 616. In various implementations, the sequencing module 620 may determine a channel for interventions or engagements based on the relative costs of each channel. Cost is a term encompassing not just financial quantities but also availability, delay, etc. For example, the cost metric of a phone call from a pharmacist may increase when fewer pharmacists are available for calls.

As an example only, first, second through nth execution queues 624-1, 624-2 . . . 624-*n* (collectively, execution queues 624) store interventions for execution by respective channels. For example, a practitioner scheduling system 628-1 may operate as a first channel. The practitioner scheduling system 628-1 allows pharmacists to place phone calls to patients to, for example, encourage adherence to medication or provide other information related to treatments or regimens. The execution queue 624-1 feeds interventions to the practitioner scheduling system 628-1.

Another example channel, an email gateway 628-2, may send emails to patients according to interventions provided by the second execution queue 624-2. A final example, network interface 628-*n*, may transmit push notifications to applications on user devices (such as smartphones, smartwatches, tablets, etc.) according to interventions queued by the nth execution queue 624-*n*. The sequencing module 620 may notify the analysis module 608 of which interventions have been queued for execution. The analysis module 608 can track the interventions and any apparent results of those interventions.

User Interface Mockups

Figure 8A:
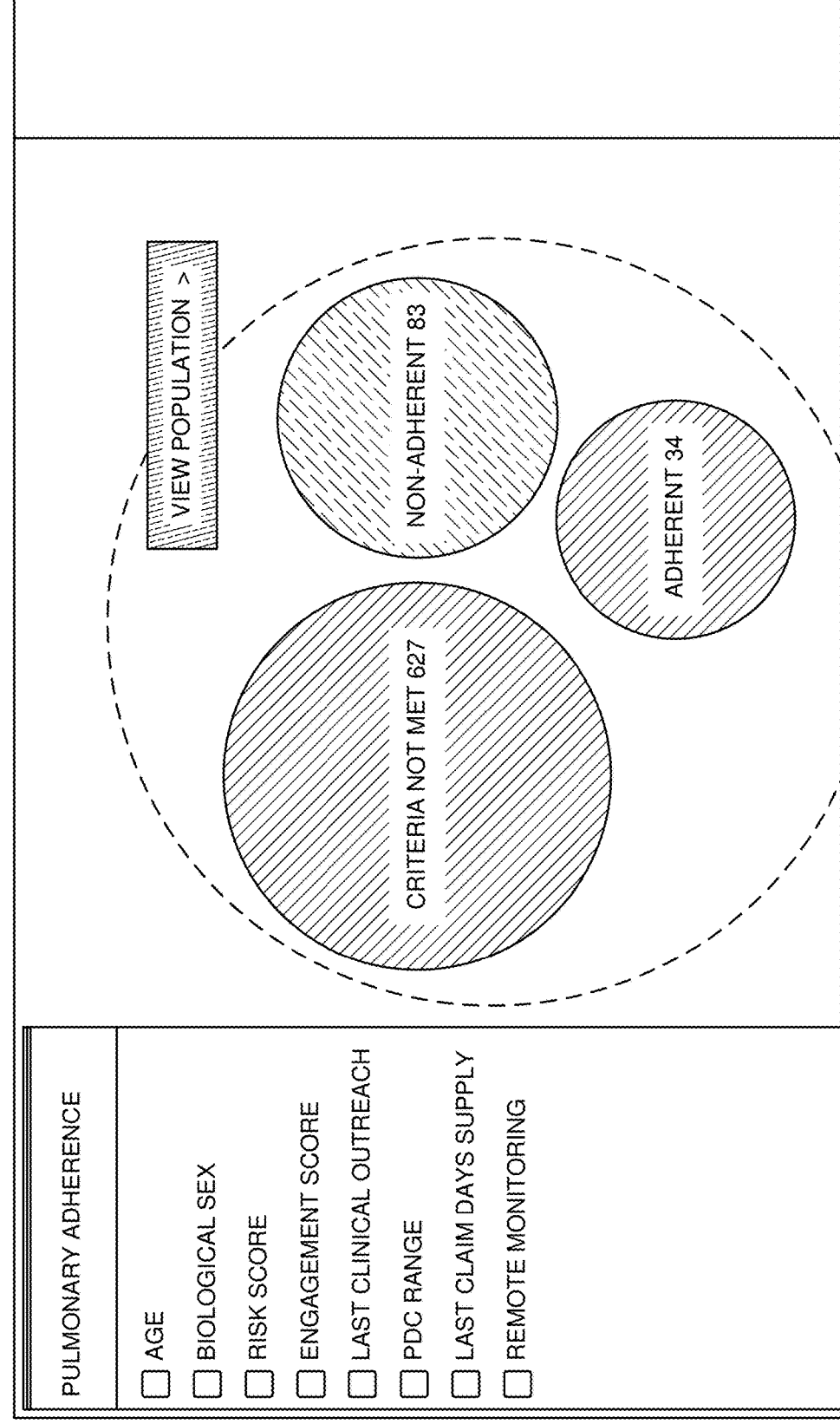

FIG. 8A is a graphical illustration of an example user interface 800-1 for displaying clinical data element groups. The user interface 800-1 may be directed to displaying clinical data insights for a variety of individual patients. For example, the user interface 800-1 is directed to pulmonary adherence, and includes various filter options on the left side of the screen. In this example, there are 627 patients for which pulmonary adherence criteria is not met, 83 members in the pulmonary non-adherence category, and 34 members in the pulmonary adherence category. As mentioned above, the sizes of the different groups may be larger or smaller relative to another, to assist the viewer in visually determining proportions or ratios of users that are adherent versus non-adherent. A user may click on one of the displayed elements to drill down and view further details of the selected element.

Figure 8B:

FIG. 8B illustrates an example user interface 800-2, which may be displayed if the user selects the non-adherent group from the user interface 800-1 of FIG. 8A. As shown in FIG. 8B, the non-adherent group is further filtered by an age range of 31 to 65 years old, and a PC range of 0 to 60.

In the example of FIG. 8B, the user interface 800-2 illustrates that within the age range of 31 to 65 years old, there are 35 members in the PDC range from 0 to 60. There are also nine members in the PDC range of 61 to 74, and six members in the PDC range 75 to 85. Again, the sizes of the displayed elements correspond to the relative numbers of members in each group.

FIG. 8C illustrates an example user interface 800-3, which may be displayed if a user selects one of the elements of the user interface 800-2 of FIG. 8B. For example, the user interface 800-3 corresponds to a user selection of the 0 to 60 PDC range element from the user interface 800-2 of FIG. 8B.

The user interface 800-3 includes an example element list of patients within the selected group. This provides a quick and easy way for an administrator, physician, nurse, etc. to quickly navigate to desired populations of members, based on generated health insights data about the members. As shown in FIG. 8C, each entry in the data structure table includes a patient name, a member ID, and a date of birth.

Each entry includes an open opportunities column, which may specify a number of opportunities for reaching out to the patient via one or more intervention channels. The structured patient detail list also includes a risk score column, a PDC column, and a PRM column. The risk score may be indicative of the likelihood that the member will experience an adverse health event with a future specified time period, such as one year.

FIG. 8D illustrates a further drill down in the user interface 800-4, which may be displayed if the user selects one of the patient entries from the element list database of the user interface 800-3 of FIG. 8C. For example, the patient details illustrated in the user interface 800-4 include a member number of the selected patient, and a client name of a group that provides a health insurance plan to the patient.

The entry of the user interface 800-4 also includes other patient data such as a phone number, a date of birth, an age, and a biological sex. An overall risk score for the patient may be displayed, based on generated health insights from the insights database 414. Similarly, an engagement score and channel score may be displayed to show one or more likelihoods that various intervention channels may change the behavior of the member, to successfully facilitate the member becoming adherent for one or more performance guarantee targets.

The user interface 800-4 also includes different tabs for outcomes, outreach, opportunities, referrals, medications, conditions, and allergies. An outreach portion at the bottom of the user interface 800-4 may be used to filtering historical outreaches to the patient, including an indication of the type of channel used, the recipient of the outreach data, a date that the outreach data was sent, the organization that sent the outreach data, the outcome of the outreach, and a type of the outreach outcome.

Figure 9:
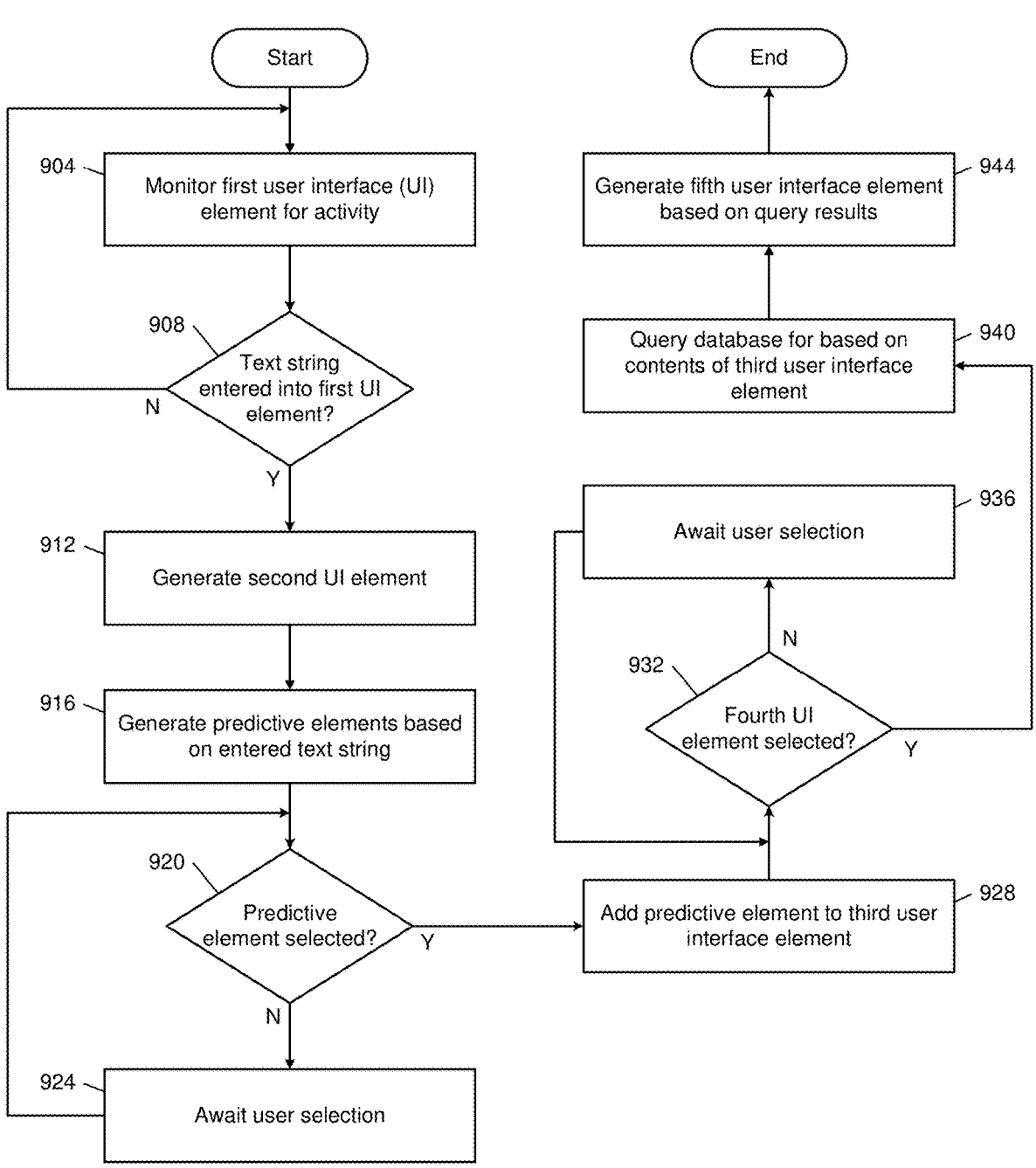
FIG. 9 is a flowchart of an example process for generating and transforming a graphical user interface according to principles of the present disclosure.
Figure 10A:
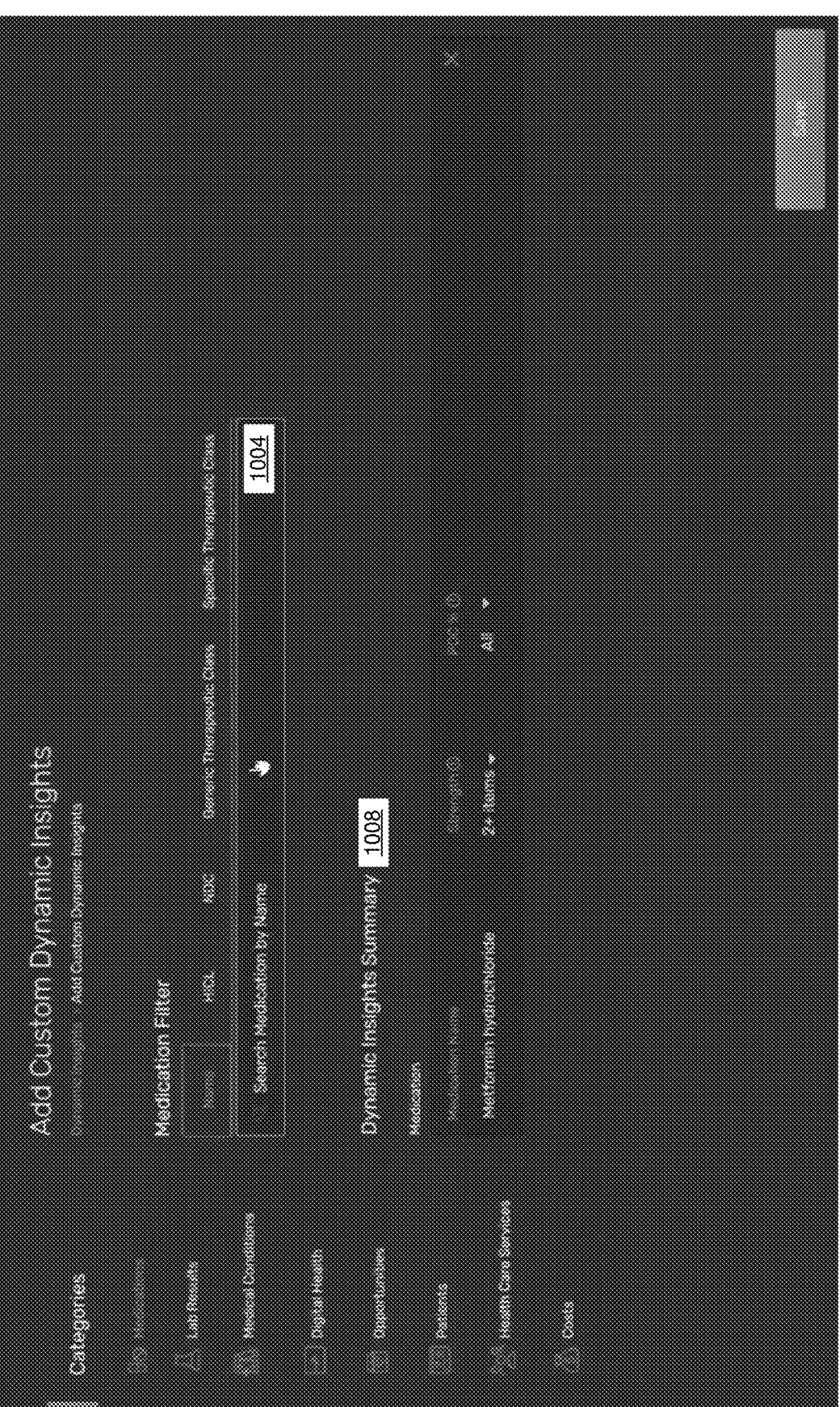
FIGS. 10A-10D illustrate example user interface elements that may be automatically generated and transformed according to principles of the present disclosure.
Figure 10B:
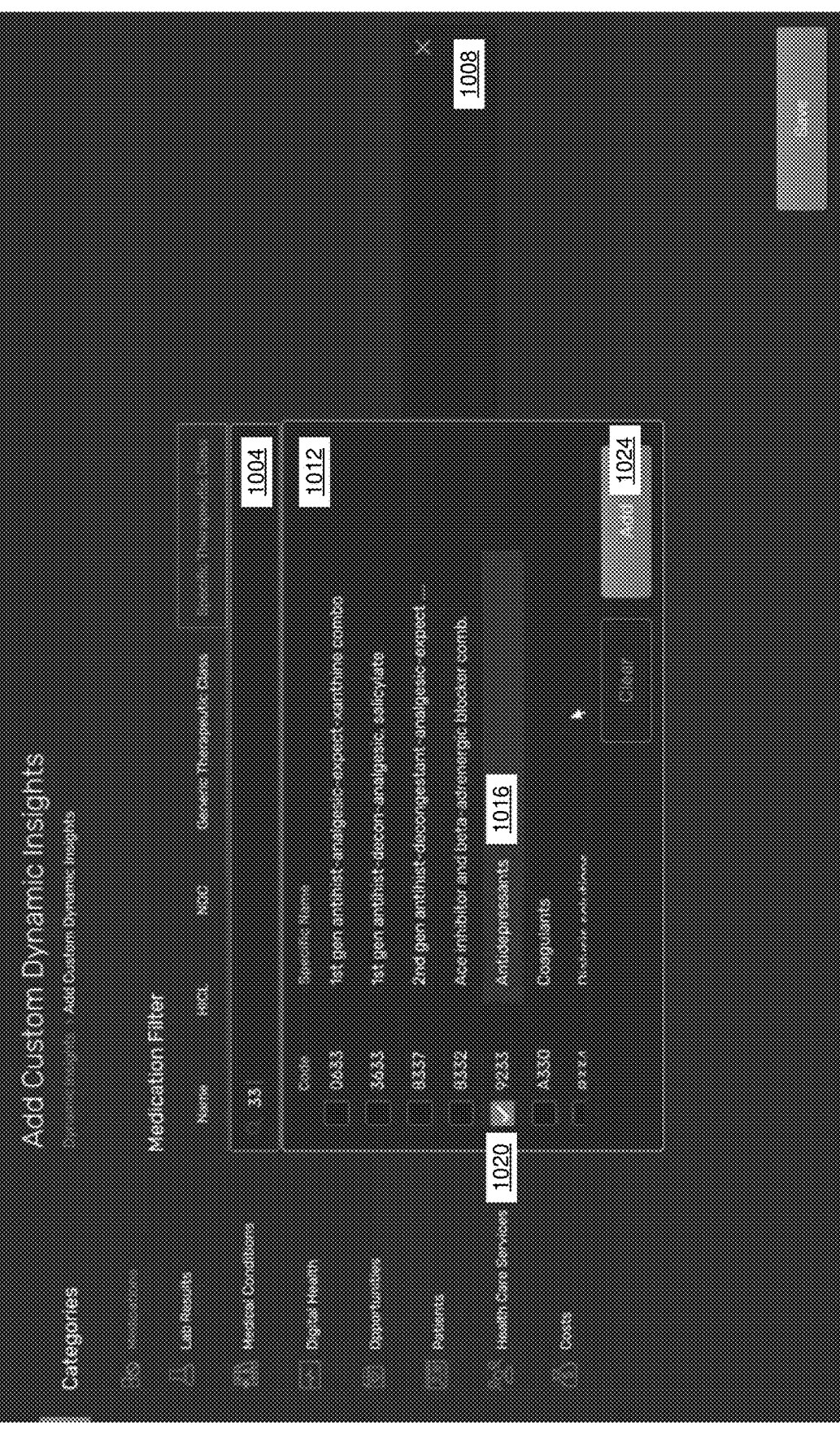

Artificial Intelligence Implemented Transformations of Interactive Graphical User Interfaces FIG. 9 is a flowchart of an example process for generating and transforming a graphical user interface according to principles of the present disclosure. FIGS. 10A-10D illustrate example user interface elements that may be automatically generated and transformed according to principles of the present disclosure. Control begins at 904 after an interactive graphical user interface such as that shown in FIGS. 10A-10D—is generated. In various implementations, the graphical user interface 504 may generate the interactive graphical user interface of FIGS. 10A-10D, which may be accessed by the user device 508 via the communications system 514. As shown in FIGS. 10A and 10B, the graphical user interface may include a first user interface element 1004. In various implementations, the first user interface element 1004 may be a selectable graphical user interface element. After the user selects the first user interface element 1004, the user may enter text strings into the first user interface element 1004.

At 904, the graphical user interface 504 monitors the first user interface element 1004 for activity—such as a user selecting or entering text into the first user interface element 1004. Control proceeds to 908. At 908, the graphical user interface 504 determines whether the first user interface element 1004 has been selected and/or whether a text string has been entered into the first user interface element 1004. If at 908 the answer is no, control proceeds back to 904. If at 908 the answer is yes, control proceeds to 912. At 912, the graphical user interface 504 generates a second user interface element, such as second user interface element 1012. Control proceeds to 916. At 916, the graphical user interface 504 generates predictive elements based on the text string entered into the first user interface element 1004. In various implementations, the graphical user interface 504 may send the text string to a predictive engine, such as the health insights generation engine 436. In various implementations, the health insights generation engine 436 may generate query one or more databases, such as storage device(s) 110, patient database 402, enterprise database 410, enrollment database 412, and/or insights database 414 and return text strings and/or alphanumeric codes relevant to the text string entered into the first user interface element 1004. The returned text strings and/or alphanumeric codes may be referred to as predictive elements 1016 (shown, for example, in FIG. 10B) and displayed within the second user interface element 1012.

In various implementations, the health insights generation engine 436 may be implemented according to artificial intelligence. In various implementations, the health insights generation engine 436 may be implemented according to machine learning techniques, and may include a trained neural network. In various implementations, the text string may be converted to input vectors for the trained neural network, and the output vectors returned by the trained neural network may be converted back into text strings and/or alphanumeric codes. The returned text strings and/or alphanumeric codes may be referred to as predictive elements 1016 (shown, for example, in FIG. 10B) and displayed within the second user interface element 1012. Control proceeds to 920.

At 920, the graphical user interface 504 determines whether one or more of the predictive elements 1016 have been selected by the user. If at 920 the answer is no, control proceeds to 924. At 924, the graphical user interface 504 awaits user selection and proceeds back to 920. If at 920 the answer is yes, control proceeds to 928. At 928, the graphical user interface element adds the selected predictive element 1016 to a third user interface element, such as third user interface element 1008 shown in FIGS. 10A and 10C. In various implementations, the user may either one of the predictive elements 1016 itself and/or a selectable field 1020 associated with the predictive element 1016, and the graphical user interface 504 adds the predictive element 1016 to the third user interface element 1008. In various implementations, the user may either one of the predictive elements 1016 itself and/or a selectable field 1020 associated with the predictive element 1016, and then a selectable button 1024, and the graphical user interface 504 adds the predictive element 1016 to the third user interface element 1008.

Figure 10C:
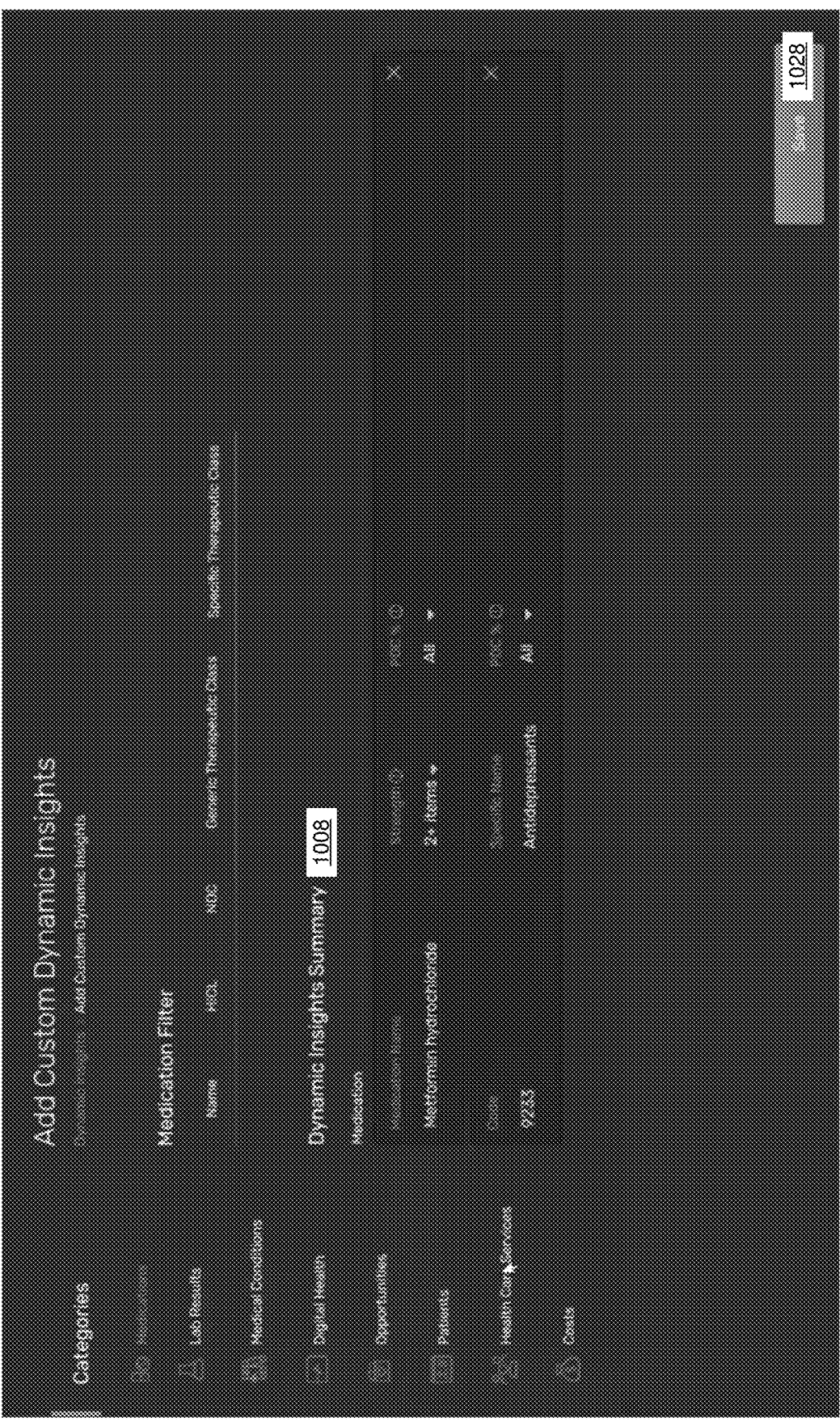
Figure 10D:
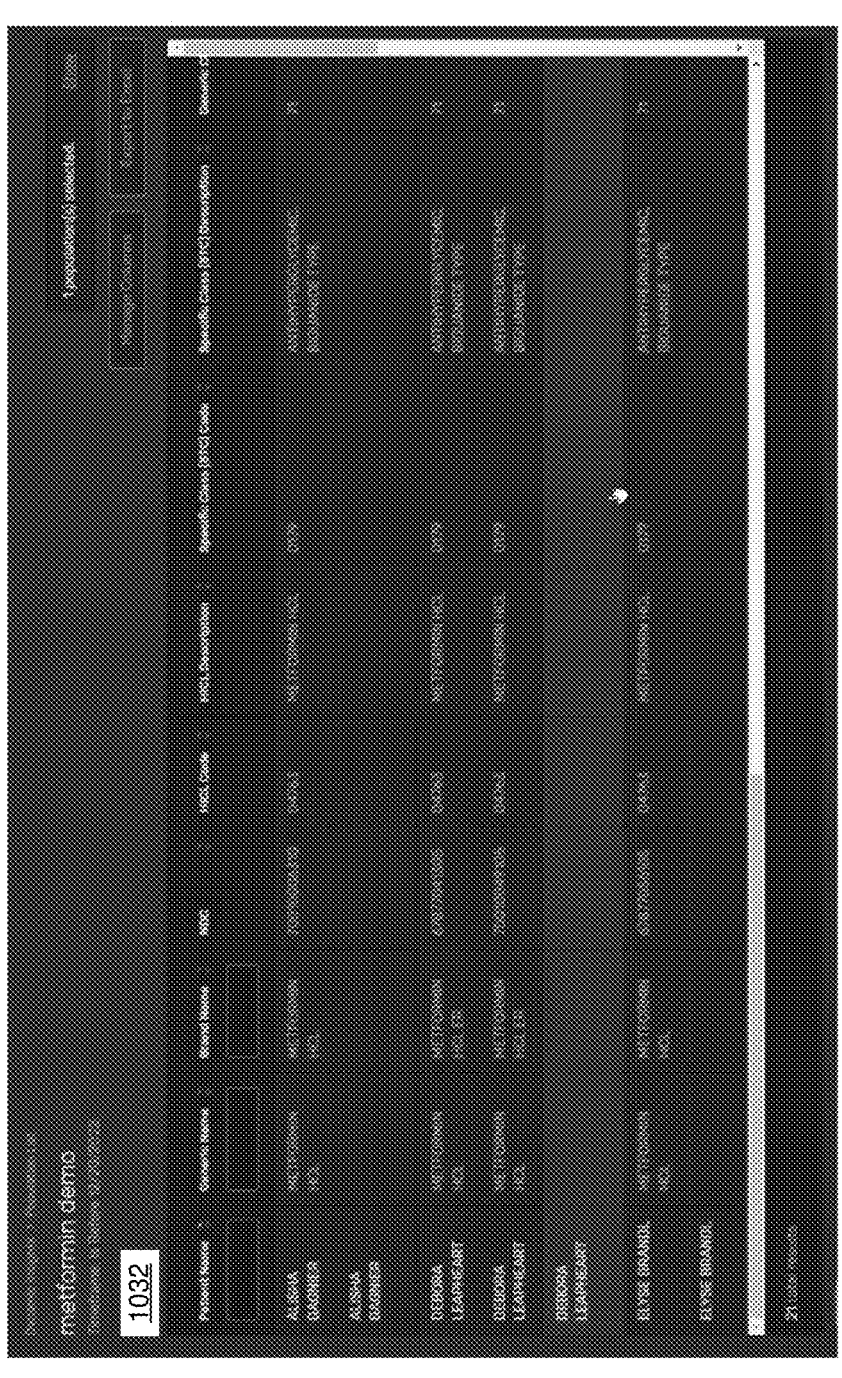

As shown in FIGS. 10A-10C, initially, the third user interface element 1008 may be populated with only a single predictive element. After the user selects predictive element 1016 of FIG. 10B, the predictive element 1016 will be added to the third user interface element 1008 such that the third user interface element includes both the single predictive element of FIG. 10A and the third user interface element 1008 (for example, as shown in FIG. 10C). In various implementations, the third user interface element 1008 may be populated with any number of predictive elements, including none. Control proceeds to 932. At 932, the graphical user interface 504 determines whether a fourth user interface element 1028 (for example, shown in FIG. 10C) is selected by the user. If at 932 the answer is no, control proceeds to 936 where the graphical user interface 504 awaits user selection. Control proceeds back to 932. If at 932 the answer is yes, control proceeds to 940.

At 940, the graphical user interface 504 queries one or more databases, such as storage device(s) 110, patient database 402, enterprise database 410, enrollment database 412, and/or insights database 414. In various implementations, the graphical user interface 504 may call on the database controller 408 to query the one or more databases. In various implementations, the query to the databases may include the predictive elements of the third user interface element 1008. Control proceeds to 944. At 944, the graphical user interface 504 generates a fifth user interface element—such as user interface element 1032—based on the results of the query at 940. In various implementations, the fifth user interface element may include a sortable table that includes the results of the query.

Figure 11A:
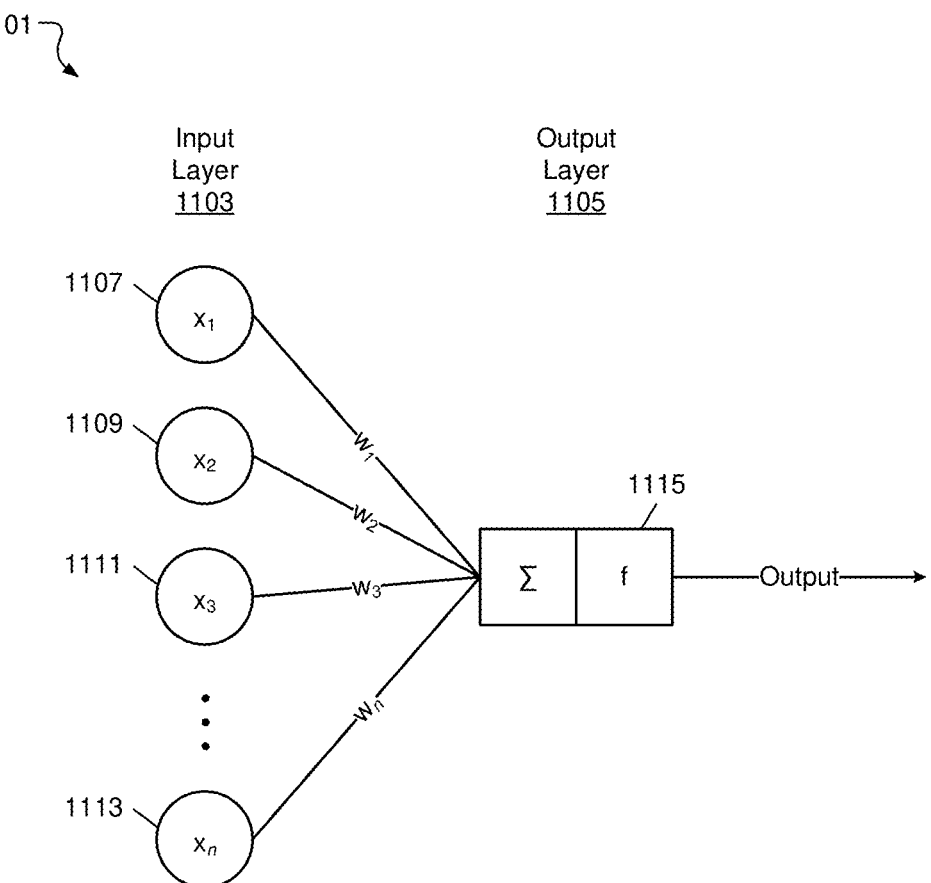
FIGS. 11A and 11B are graphical representations of example neural networks for implementing aspects of the present disclosure.

FIG. 11A is a graphical representation of an example neural network with no hidden layers for implementing some examples of the health insights generation engine 436. Generally, neural networks may include an input layer, an output layer, and any number—including none—of hidden layers between the input layer and the output layer. Each layer of the machine learning model may include one or more nodes with each node representing a scalar. Input variables may be provided to the input layer. Any hidden layers and/or the output layer may transform the inputs into output variables, which may then be output from the neural network at the output layer. In various implementations, the input variables to the neural network may be an input vector having dimensions equal to the number of nodes in the input layer. In various implementations, the output variables of the neural network may be an output vector having dimensions equal to the number of nodes in the output layer.

Generally, the number of hidden layers—and the number of nodes in each layer—may be selected based on the complexity of the input data, time complexity requirements, and accuracy requirements. Time complexity may refer to an amount of time required for the neural network to learn a problem—which can be represented by the input variables—and produce acceptable results—which can be represented by the output variables. Accuracy may refer to how close the results represented by the output variables are to real results. In various implementations, increasing the number of hidden layers and/or increasing the number of nodes in each layer may increase the accuracy of neural networks but also increase the time complexity. Conversely, in various implementations, decreasing the number of hidden layers and/or decreasing the number of nodes in each layer may decrease the accuracy of neural networks but also decrease the time complexity.

As shown in FIG. 11A, some examples of neural networks, such as neural network 1101, may have no hidden layers. Neural networks with no hidden layers may be suitable for solving problems with input variables that represent linearly separable data. For example, if data can be represented by sets of points existing in a Euclidean plane, then the data may be considered linearly separable if the sets of points can be divided by a single line in the plane. If the data can be represented by sets of points existing in higher-dimensional Euclidean spaces, the data may be considered linearly separable if the sets can be divided by a single plane or hyperplane. Thus, in various implementations, the neural network 1101 may function as a linear classifier and may be suitable for performing linearly separable decisions or functions.

As shown in FIG. 11A, the neural network 1101 may include an input layer—such as input layer 1103, an output layer—such as output layer 1105, and no hidden layers. Data may flow forward in the neural network 1101 from the input layer 1103 to the output layer 1105, and the neural network 1101 may be referred to as a feedforward neural network. Feedforward neural networks having no hidden layers may be referred to as single-layer perceptrons. Feedforward neural networks having no hidden layers can include a linear classifier at select nodes in certain layers. In various implementations, the input layer 1103 may include one or more nodes, such as nodes 1107-1113. Although only four nodes are shown in FIG. 11A, the input layer 1103 may include any number of nodes, such as n nodes. In various implementations, each node of the input layer 1103 may be assigned any numerical value. For example, node 1107 may be assigned a scalar represented by $x_1$, node 1109 may be assigned a scalar represented by $x_2$, node 1111 may be assigned a scalar represented by $x_3$, and node 1113 may be assigned a scalar represented by $x_n$.

In various implementations, each of the nodes 1107-1113 may correspond to an element of the input vector. For example, the input variables to a neural network may be expressed as input vector i having n dimensions. So for neural network 1101—which has an input layer 1103 with nodes 1107-1113 assigned scalar values $x_1$-$x_n$, respectively—input vector i may be represented by equation (1) below:

$$i = \langle x_1, x_2, x_3, x_n \rangle . \tag{1}$$

In various implementations, input vector i may be a signed vector, and each element may be a scalar value in a range of between about −1 and about 1. So, in some examples, the ranges of the scalar values of nodes 1112-1124 may be expressed in interval notation as: $x_1 \in [-1,1]$, $x_2 \in [-1,1]$, $x_3 \in [-1,1]$, and $x_n \in [-1,1]$.

Each of the nodes of a previous layer of a feedforward neural network—such as neural network 1101—may be multiplied by a weight before being fed into one or more nodes of a next layer. For example, the nodes of the input layer 1103 may be multiplied by weights before being fed into one or more nodes of the output layer 1105. In various implementations, the output layer 1105 may include one or more nodes, such as node 1115. While only a single node is shown in FIG. 11A, the output layer 1105 may have any number of nodes. In the example of FIG. 11A, node 1107 may be multiplied by a weight $w_1$ before being fed into node 1115, node 1109 may be multiplied by a weight $w_2$ before being fed into node 1115, node 1111 may be multiplied by a weight $w_3$ before being fed into node 1115, and node 1113 may be multiplied by a weight $w_n$ before being fed into node 1115. At each node of the next layer, the inputs from the previous layer may be summed, and a bias may be added to the sum before the summation is fed into an activation function. The output of the activation function may be the output of the node.

In various implementations—such as in the example of FIG. 11A, the summation of inputs from the previous layer may be represented by $\Sigma$. In various implementations, if a bias is not added to the summed outputs of the previous layer, then the summation $\Sigma$ may be represented by equation (2) below:

$$\Sigma = x_1 w_1 + x_2 w_2 + x_3 w_3 + x_n w_n. \tag{2}$$

In various implementations, if a bias b is added to the summed outputs of the previous layer, then summation $\Sigma$ may be represented by equation (3) below:

$$\Sigma = x_1 w_1 + x_2 w_2 + x_3 w_3 + x_n w_n + b. \tag{3}$$

The summation $\Sigma$ may then be fed into activation function $f$. In various implementations, the activation function $f$ may be any mathematical function suitable for calculating an output of the node. Example activation functions $f$ may include linear or non-linear functions, step functions such as the Heaviside step function, derivative or differential functions, monotonic functions, sigmoid or logistic activation functions, rectified linear unit (ReLU) functions, and/or leaky ReLU functions. The output of the function $f$ may then be the output of the node. In a neural network with no hidden layers—such as the single-layer perceptron shown in FIG. 11A—the output of the nodes in the output layer may be the output variables or output vector of the neural network. In the example of FIG. 11A, the output of node 1115 may be represented by equation (4) below if the bias b is not added, or equation (5) below if the bias b is added:

$$\text{Output} = f(x_1 w_1 + x_2 w_2 + x_3 w_3 + x_n w_n), \text{ and} \tag{4}$$

$$\text{Output} = f(x_1 w_1 + x_2 w_2 + x_3 w_3 + x_n w_n + b). \tag{5}$$

Thus, as neural network 1101 is illustrated in FIG. 11A with an output layer 1105 having only a single node 1115, the output vector of neural network 1101 is a one-dimensional vector (e.g., a scalar). However, as the output layer 1105 may have any number of nodes, the output vector may have any number of dimensions.

Figure 11B:
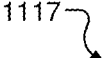
Figure 11B:
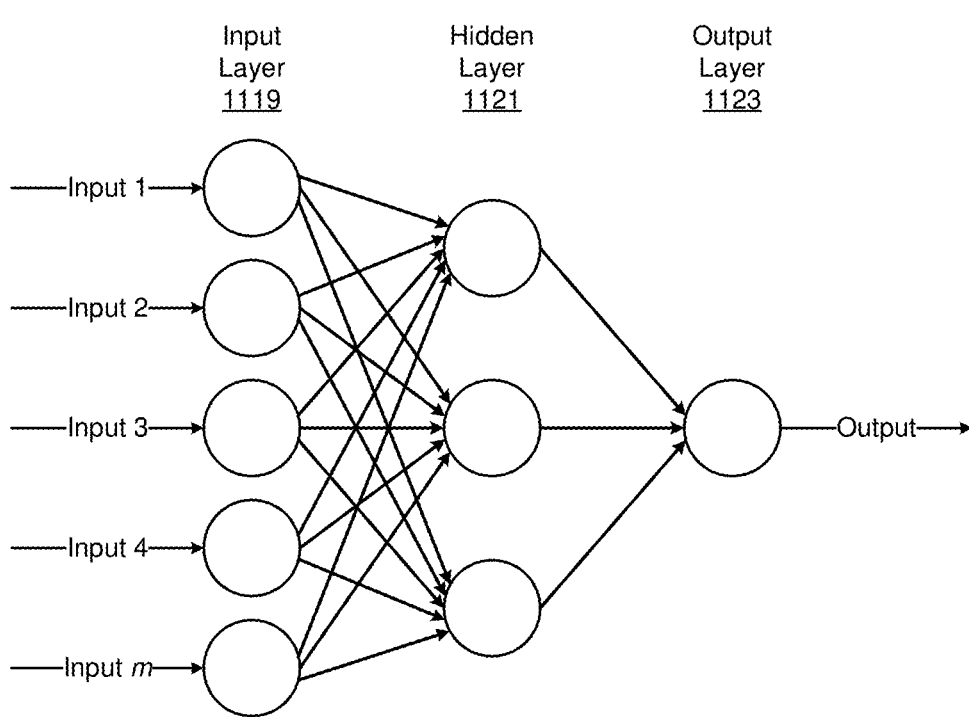

FIG. 11B is a graphical representation of an example neural network with one hidden layer for implementing some examples of the health insights generation engine 436. Neural networks with one hidden layer may be suitable for performing continuous mapping from one finite space to another. Neural networks having two hidden layers may be suitable for approximating any smooth mapping to any level of accuracy. As shown in FIG. 11B, the neural network 1117 may include an input layer—such as input layer 1119, a hidden layer—such as hidden layer 1121, and an output layer—such as output layer 1123. In the example of FIG. 11B, each node of a previous layer of neural network 1117 may be connected to each node of a next layer. So, for example, each node of the input layer 1119 may be connected to each node of the hidden layer 1121, and each node of the hidden layer 1121 may be connected to each node of the output layer 1123. Thus, the neural network shown in FIG. 11B may be referred to as a fully-connected neural network. However, while neural network 1117 is shown as a fully-connected neural network, each node of a previous layer does not necessarily need to be connected to each node of a next layer. A feedforward neural network having at least one hidden layer—such as neural network 1117—may be referred to as a multilayer perceptron.

In a manner analogous to neural networks described with reference to FIG. 11A, input vectors for neural network 1117 may be m-dimensional vectors, where m is a number of nodes in input layer 1119. Each element of the input vector may be fed into a corresponding node of the input layer 1119. Each node of the input layer 1119 may then be assigned a scalar value corresponding to the respective element of the input vector. Each node of the input layer 1119 may then feed its assigned scalar value—after it is multiplied by a weight—to one or more nodes of the next layer, such as hidden layer 1121. Each node of hidden layer 1121 may take a summation of its inputs (e.g., a weighted summation of the nodes of the input layer 1119) and feed the summation into an activation function. In various implementations, a bias may be added to the summation before it is fed into the activation function. In various implementations, the output of each node of the hidden layer 1121 may be calculated in a manner similar or analogous to that described with respect to the output of node 1115 of FIG. 11A.

Each node of the hidden layer 1121 may then feed its output—after it is multiplied by a weight—to one or more nodes of the next layer, such as output layer 1123. Each node of the output layer 1123 may take a summation of its inputs (e.g., a weighted summation of the outputs of the nodes of hidden layer 1121) and feed the summation into an activation function. In various implementations, a bias may be added to the summation before it is fed into the activation function. In various implementations, the output of each node of the output layer 1123 may be calculated in a manner similar or analogous to that described with respect to the output of node 1115 of FIG. 11A. The output of the nodes of the output layer 1123 may be the output variables or the output vector of neural network 1117. While only a single hidden layer is shown in FIG. 11B, neural network 1117 may include any number of hidden layers. A weighted summation of the outputs of each previous hidden layer may be fed into nodes of the next hidden layer, and a weighted summation of the outputs of those nodes may be fed into a further hidden layer. A weighted summation of the outputs of a last hidden layer may be fed into nodes of the output layer.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system comprising:
memory hardware configured to store instructions, and
processor hardware configured to execute the instructions, wherein the instructions include:
  generating an interactive graphical user interface including a first user interface element,
  in response to receiving a first text string at the first user interface element, automatically generating a second user interface element,
  generating a set of attributes associated with the first text string,
  generating a first set of predictive filters based on the generated set of attributes,
  populating the second user interface element with the first set of predictive filters,
  in response to a selection of a first predictive filter of the first set of predictive filters, automatically adding the first predictive filter to a third user interface element,
  generating a second set of attributes associated with a second text string different than the first input string and input at the third user interface element,
  generating a second set of predictive filters based on the second set of attributes and the first predictive filter, and
  in response to a selection of a second predictive filter of the second set of predictive filters:
    querying a database based on the first predictive filter and the second predictive filter, and
    populating a fifth user interface element with results of the query.

2. The system of claim 1 wherein the first text string is converted to an input vector and passed to a trained machine learning model to generate the first set of predictive filters.

3. The system of claim 2 wherein the trained machine learning model includes a trained neural network.

4. The system of claim 3 wherein the trained neural network includes:
an input layer having a plurality of nodes;
one or more hidden layers having a plurality of nodes; and
an output layer having a plurality of nodes.

5. The system of claim 4 wherein:

each node of the input layer is connected to at least one node of the one or more hidden layers;

each node of the input layer represents a numerical value; and the at least one node of the one or more hidden layers receives the numerical value multiplied by a weight as an input.

6. The system of claim 5 wherein the at least one node of the one or more hidden layers receives the numerical value multiplied by the weight and offset by a bias as the input.

7. The system of claim 6 wherein the at least one node of the one or more hidden layers is configured to:

sum inputs received from nodes of the input layer;

provide the summed inputs to an activation function; and provide an output of the activation function to one or more nodes of a next layer.

8. The system of claim 7 wherein the first set of predictive filters includes at least one of:

a first data structure associated with one or more medications;

a second data structure associated with one or more laboratory tests; and a third data structure associated with one or more medical conditions.

9. The system of claim 8 wherein the fifth user interface element displays the results of the query in an interactive table.

10. A computer-implemented method comprising:

generating an interactive graphical user interface including a first user interface element, in response to receiving a first text string into the first user interface element, automatically generating a second user interface element, generating a set of attributes associated with the first text string, generating a first set of predictive filters corresponding to the set of attributes, populating the second user interface element with the first set of predictive filters, in response to a selection of a first predictive filter of the first set of predictive filters, automatically adding the first predictive filter to a third user interface element, generating a second set of attributes associated with a second text string different than the first input string and input at the third user interface, generating a second set of predictive filters based on the second set of attributes and the first predictive filter, and in response to a selection of a second predictive filter of the second set of predictive filters:

querying a database based on the first predictive filter and the second predictive filter, and populating a fifth user interface element with results of the query.

11. The computer-implemented method of claim 10 wherein the first text string is converted to an input vector and passed to a trained machine learning model to generate the first set of predictive filters.

12. The computer-implemented method of claim 11 wherein the trained machine learning model includes a trained neural network.

13. The computer-implemented method of claim 12 wherein the trained neural network includes:

an input layer having a plurality of nodes;

one or more hidden layers having a plurality of nodes; and an output layer having a plurality of nodes.

14. The computer-implemented method of claim 13 wherein:

each node of the input layer is connected to at least one node of the one or more hidden layers;

each node of the input layer represents a numerical value; and the at least one node of the one or more hidden layers receives the numerical value multiplied by a weight as an input.

15. The computer-implemented method of claim 14 wherein the at least one node of the one or more hidden layers receives the numerical value multiplied by the weight and offset by a bias as the input.

16. The computer-implemented method of claim 15 wherein the at least one node of the one or more hidden layers is configured to:

sum inputs received from nodes of the input layer;

provide the summed inputs to an activation function; and provide an output of the activation function to one or more nodes of a next layer.

17. The computer-implemented method of claim 16 wherein the first set of predictive filters includes at least one of:

a first data structure associated with one or more medications;

a second data structure associated with one or more laboratory tests; and a third data structure associated with one or more medical conditions.

18. A computerized method comprising:

in response to receiving a first text string, presenting a first plurality of data filters to a user in a graphical user interface based on the first text string;

in response to a selection of a first data filter of the first plurality of data filters, presenting a plurality of value choices to the user in the graphical user interface;

in response to a selection of a first value choice of the plurality of value choices, performing a first query on a database, wherein the first query is based on the first value choice;

based on results of the first query and a second text string different than the first input string and input at the third user interface, determining a second plurality of data filter elements;

presenting the second plurality of data filter elements to the user in the graphical user interface;

in response to a selection of values for multiple data filter elements of the first plurality of data filter elements and the second plurality of data filter elements, presenting a graphical representation of a subset of records from the database, wherein the subset of records is determined by the selected values for the multiple data filter elements; and in response to receiving a request, queuing a set of channel-specific communications for the subset of records.

* * * * *